United States Patent [19]

Nimura et al.

[11] Patent Number: 5,231,584
[45] Date of Patent: Jul. 27, 1993

[54] NAVIGATION APPARATUS WITH NON-VOLATILE MEMORY FOR RETURN TO INITIAL DEPARTURE POINT

[75] Inventors: Mitsuhiro Nimura; Shoji Yokoyama; Koji Sumiya; Shuzo Moroto; Kiyohide Kato, all of Anjo, Japan

[73] Assignees: Aisin AW Co., Ltd.; Kabushiki Kaisha Shinsangyokaihatsu, both of Japan

[21] Appl. No.: 759,610

[22] Filed: Sep. 16, 1991

Related U.S. Application Data

[63] Continuation of Ser. No. 415,297, Mar. 12, 1990, abandoned.

[30] Foreign Application Priority Data

| Dec. 28, 1987 | [JP] | Japan | 62-333053 |
| Dec. 28, 1987 | [JP] | Japan | 62-333055 |
| Aug. 10, 1988 | [JP] | Japan | 63-199093 |

[51] Int. Cl.⁵ .............................. G06F 15/50
[52] U.S. Cl. ..................... 364/444; 364/449; 340/990; 340/995
[58] Field of Search .......... 364/443, 444, 449, 424.03; 340/988, 990, 995; 73/178 R

[56] References Cited

U.S. PATENT DOCUMENTS

| 4,382,178 | 5/1983 | Mori | 364/444 |
| 4,642,776 | 2/1987 | Matsumoto et al. | 364/449 |
| 4,814,989 | 3/1989 | Döbereiner et al. | 364/444 |
| 4,888,699 | 12/1989 | Knoll et al. | 364/449 |
| 4,897,792 | 1/1990 | Hosoi | 364/449 |
| 4,937,751 | 6/1990 | Nimura et al. | 364/449 |
| 4,992,947 | 2/1991 | Nimura et al. | 364/444 |

*Primary Examiner*—Parshotam S. Lall
*Assistant Examiner*—Michael Zanelli
*Attorney, Agent, or Firm*—Lorusso & Loud

[57] ABSTRACT

A navigation apparatus has an input unit (1), a CPU (2), a display unit (3) and a memory unit (4), the memory unit (4) being a memory such as a CD-ROM in which network data of geographical points, namely destinations and present locations, and information are stored in advance. Also stored are map data (10), an intersection list (11), a destination list (12), road data (13) and a region name list (14), etc. When a destination is designated by an input from the input means (1), the CPU (2) performs an exchange with a program, stored in a ROM (9a), in order to set information for travel to the destination by course exploration in accordance with each geographical point stored in the memory unit (4). This information is stored in a memory such as a RAM (9b). In an embodiment, the RAM (9b) is provided with a non-volatile area for storing departure-point data (east longitude, north latitude, etc.). When an input is made by a reset switch in entering a departure point, the data in this non-volatile area can be rewritten. Data written in are preserved until the reset switch is pressed again and a geographical point is entered. Data will not be erased even if an ignition switch is turned off.

8 Claims, 29 Drawing Sheets

FIG. 6

NODE SERIES DATA

| NODE NO. | EAST LONGITUDE | NORTH·LATITUDE | ATTRIBUTE |
|---|---|---|---|
| 0001 | 135··· | 35··· | 0 1 |
| 0002 | 135··· | 35··· | 0 0 |
| ⋮ | | | |

FIG. 7

INTERSECTION LIST

| CODE NO. | INTERSECTION NAME | INTERSECTION NO. | LANDMARK | ATTRIBUTE | CONNECTING INTERSECTION NO. ① | CONNECTING INTERSECTION NO. ② |
|---|---|---|---|---|---|---|
| 0101 | GION | 10 | MARUYAMA PARK | 01 | 2147 | 2152 |
| 0102 | KITANO HAKUBAICHO | 398 | GASOLINE STATION | 00 | 59 | 3096 |

FIG.8

DESTINATION LIST

| CODE NO. | DESTINATION NAME | PARKING LOT NO. | CONNECTING INTERSECTION NO. ① | CONNECTING INTERSECTION NO. ② | PARKING LOT DIRECTION | PHOTO NO. ① | PHOTO NO. ② | EXIT PHOTO NO. | BLOCK | EAST LONGITUDE | NORTH LATITUDE |
|---|---|---|---|---|---|---|---|---|---|---|---|
| 0001 | ARASHIYAMA | 1 | 2103 | 2097 | −1 | 1121 | 0 | 0 | 0A00 | 135,... | 35,... |
| 0012 | KINKAKU TEMPLE | 1 | 2153 | 2265 | +1 | 2019 | 2020 | 2021 | 0CFF | 135,... | 35,... |

| ROAD DATA | | | | | | | | | | | |
|---|---|---|---|---|---|---|---|---|---|---|---|
| ROAD NO. | STARTING POINT INTERSECTION NO. | END POINT INTERSECTION NO. | NO. OF NEXT ROAD HAVING SAME STARTING POINT | NO. OF NEXT ROAD HAVING SAME END POINT | ROAD WIDTH | PROHIBITION ① | PROHIBITION ② | UNNECESSARY GUIDANCE | PHOTOGRAPH NO. | NUMBER OF NODES | LEADING ADDRESS OF NODE SERIES DATA |
| 1 | — | 2 | 7 | 4 | — | — | — | 3 | — | 15 | 100 |
| 2 | 2 | 1 | 3 | 8 | — | — | — | 7 | 2 | 13 | 200 |
| 3 | 2 | 3 | 2 | 3 | 2 | — | — | 5 | 3 | 9 | 300 |
| 4 | 3 | 2 | 5 | 6 | 2 | — | — | 2 | 4 | 20 | 400 |
| 5 | 3 | 4 | 4 | 7 | 2 | 6 | — | 8 | 5 | 25 | 500 |
| 6 | 4 | 2 | 8 | — | — | 3 | 2 | — | 6 | 30 | 600 |
| 7 | — | 4 | — | 5 | 0 | — | — | — | 7 | 9 | 700 |
| 8 | 4 | — | 6 | 2 | 0 | — | — | — | 8 | 3 | 800 |

FIG.11(a)

```
| DESTINATION | SELECT DESTINATION |
| INPUT       |                    |
YOUR DESTINATION IS_____.
IF INCORRECT, PRESS HELP BUTTON
AT LEFT AND CHANGE DEPARTURE POINT.
[SIGHTSEEING]   [LODGINGS]
[DINING]        [SOUVENIRS]
[CODE NO.       [RETURN]
 INPUT]
```

 RED COLOR

SELECTED GENRE

FIG.11(b)

```
| SIGHTSEEING | SELECT WHERE YOU WISH TO GO. |
[ARASHIYAMA]      [IMPERIAL PALACE]
[KINKAKU TEMPLE]  [BOTANICAL GARDEN]
[GION]            [NANZEN TEMPLE]
[GINKAKU TEMPLE]  [CODE NO. INPUT]
[PRECEDING PAGE]  [NEXT PAGE]
```

FIG.11(c)

```
| SIGHTSEEING | OK ? |
ARASHIYAMA        IMPERIAL PALACE
KINKAKU TEMPLE    BOTANICAL GARDEN
GION              NANZEN TEMPLE
GINKAKU TEMPLE    CODE NO. INPUT
[OK]              [CANCEL]
```

| DEPARTURE-POINT SETTING | SELECT DEPARTURE PLACE NAME |
|---|---|
| PLACE OF BUSINESS AT STATION | ------ |
| CODE NO. INPUT | |
| | |
| | |

FIG.14(b)

| DEPARTURE-POINT SETTING | OK ? |
|---|---|
| PLACE OF BUSINESS AT STATION | ------ |
| CODE NO. INPUT | |
| | |
| | |
| OK | CANCEL |

| INTERSECTION NO. | EAST LONGITUDE (137°) | NORTH LATITUDE (35°) | SMALLEST ROAD NO. OF EXITING ROADS | INTERSECTION NO. OF BLOCK ALONGSIDE | NUMBER OF EXITING ROADS | INTERSECTION NAME |
|---|---|---|---|---|---|---|
| 1 | 5' 43" | 3' 01" | 1 | — | 3 | — |
| 2 | 5' 42" | 3' 06" | 4 | — | 4 | MINAMI-ANJO STN. |
| 3 | 5' 51" | 3' 09" | 8 | — | 3 | MINAMI-ANJO STN. HIGASHI |
| 4 | 5' 34" | 2' 52" | 11 | — | 4 | ASAHI-CHO |
| 5 | 5' 27" | 3' 02" | 15 | — | 4 | A101-CHO |
| 6 | 5' 41" | 3' 16" | 19 | — | 4 | MINAMI-MACHI |
| 7 | 5' 53" | 3' 12" | 23 | — | 4 | GOKURAKUBO HIGASHI |
| 8 | 5' 25" | 2' 43" | 27 | — | 4 | ASAHI-CHO NISHI |
| 9 | 5' 33" | 2' 53" | 31 | — | 1 | — |
| 10 | 5' 35" | 2' 51" | 32 | — | 1 | — |
| 11 | 5' 27" | 3' 03" | 33 | — | 1 | — |
| 12 | 5' 28" | 3' 00" | 34 | — | 1 | — |
| 13 | 5' 11" | 2' 54" | 35 | — | 4 | SUEHIRO-CHO |

FIG. 17

| ROAD NO. | END-POINT INTERSECTION NO. | NO. OF NEXT ROAD HAVING SAME STARTING POINT |
|---|---|---|
| 1 | 3 | 2 |
| 2 | 4 | 3 |
| 3 | 2 | 1 |
| 4 | 5 | 5 |
| 5 | 3 | 6 |
| 6 | 6 | 7 |
| 7 | 1 | 5 |
| 8 | 2 | 9 |
| 9 | 7 | 10 |
| 10 | 1 | 8 |
| 11 | 1 | 12 |
| 12 | 8 | 13 |
| 13 | 9 | 14 |
| 14 | 10 | 11 |
| 15 | 11 | 16 |
| 16 | 12 | 17 |
| 17 | 2 | 18 |

GUIDANCE STARTING-POINT INPUT

YOU WERE GUIDED TO

MEITETSU MINAMI ANJO STATION

LAST TIME.

IS GUIDANCE STARTING POINT IN THE SURROUNDING AREA?

YES    NO

FIG. 23

GUIDANCE STARTING-POINT INPUT
SELECT ITEM FROM MENU AT NEARBY INTERSECTION OR IN FRONT OF LAST GUIDANCE POINT

| MINAMI ANJO STN. | MINAMI-ANJO STN. HIGASHI |
|---|---|
| ASAHI-CHO | AIOI-CHO |
| MINAMI-MACHI | GOKURAKUBO HIGASHI |
| OTHER INTERSECTION | IN FRONT OF LAST GUIDANCE POINT |

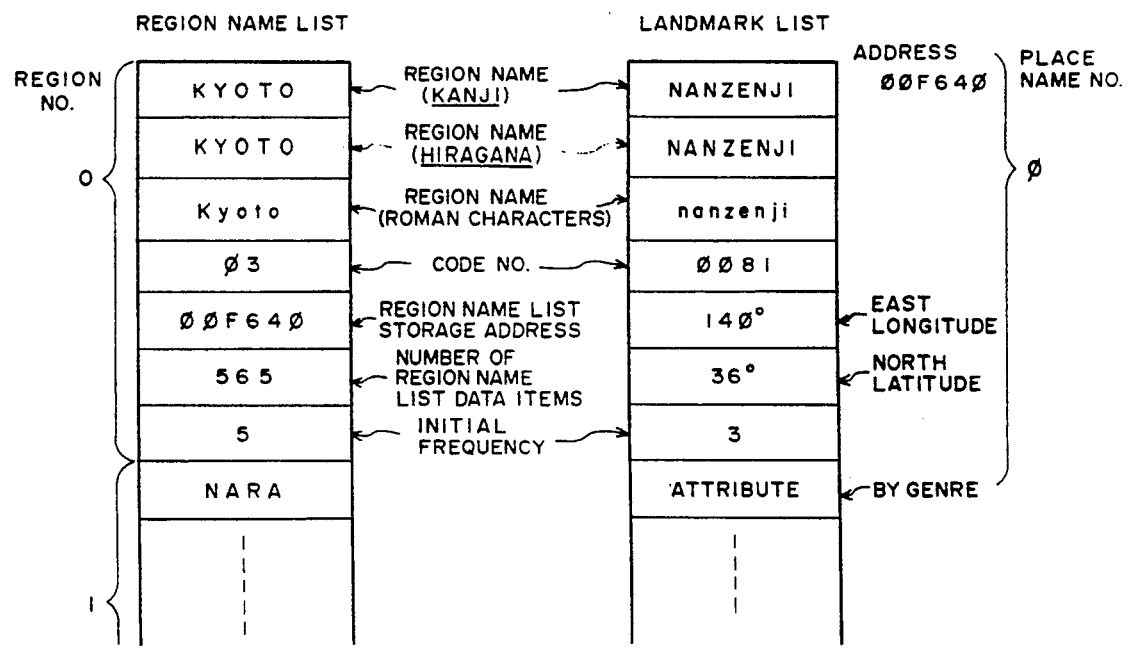

ROMAN CHARACTER SORT FILE

| LANDMARK (ROMAN CHARACTERS) | DATA STORAGE ADDRESS |
|---|---|
| ARASIYAMA | ØF84Ø |
| ANRAKUJI | ØF73Ø |
| ⋮ | ⋮ |

FIG. 26(a)

HIRAGANA SORT FILE

| LANDMARK (HIRAGANA CHARACTERS) | DATA STORAGE ADDRESS |
|---|---|
| ARASIYAMA | ØF84Ø |
| ANRAKUJI | ØF73Ø |
| ⋮ | ⋮ |

FIG. 26(b)

INTERSECTION FILE

| CODE NO. | INTERSECTION NAME | SIGNAL PRESENT? | CODE NO. OF INTERSECTION TRAVELLED NEXT |
|---|---|---|---|
| ØØ1 | KANDA | YES | ØØ2 |
| ØØ2 | YUSHIMA | YES | ØØ4 |
| ⋮ | ⋮ | ⋮ | ⋮ |

ROMAN           4    5    6
 CHARACTER INPUT

CODE NO. INPUT  7    8    9

OK   0   CANCEL
```

KYOTO GOSHO          KIYOMIZU TEMPLE

KINKAKU TEMPLE

PRECEDING              NEXT PAGE
   PAGE
```

NAVIGATION APPARATUS WITH NON-VOLATILE MEMORY FOR RETURN TO INITIAL DEPARTURE POINT

This application is a continuation of application Ser. No. 07/415,297, filed Mar. 12, 1990, now abandoned.

DESCRIPTION

1. Technical Field

This invention relates to a navigation apparatus which, upon being provided with an input of a desired destination, furnishes course guidance by outputting guidance information for travel to the destination.

2. Background Art

A navigation apparatus provides course guidance for travel to a destination to a driver who is unfamiliar with the local geography. Recent years have seen extensive development of such navigation apparatus.

Conventionally, a vehicular navigation apparatus relies upon so-called "route matching" in which a course is set from a starting point to a desired destination before the vehicle begins travelling, with course guidance being provided to the driver in accordance with the course set. In some of these apparatus, a map is displayed on the screen of a CRT and the course is superimposed on the map when the driver designates a specific course. In a case where an intersection at which a turn is to be made next is designated in accordance with the preset course, the distance to this intersection is displayed numerically or in the form of a graph. When a turn is to be made at an intersection using such a navigation apparatus, the driver observes the course displayed on the map to decide the next intersection at which the turn is to be made, or the driver looks at the numeric or graphical display to ascertain the distance to the intersection where the turn is to be made, thereby determining the proper intersection.

In a case where the vehicle returns from the destination to the point of departure, generally the course from the departure point to the destination is set again before travelling. A system in which round-trip data are stored and serve as return data to eliminate an input of position at the time of return has been proposed in Japanese Patent Application Laid-Open Nos. 59-196413 and 60-37100.

However, in a system in which the round-trip data are stored and serve as data for the return trip, these data are obtained by setting a course from the departure point to the destination before travel. Consequently, the system cannot be applied to a case where a plurality of destinations are to be traversed.

Furthermore, in the conventional navigation apparatus, the code of an input intersection must be found in an intersection list and then entered from a keyboard or the like when a departure point is to be inputted. This requires time, labor and difficulty in use. In addition, since the departure point is not a precise intersection position, distance precision for plotting the present position is poor.

The conventional navigation apparatus is such that a course is set from a departure point to a destination before the vehicle begins travelling and course guidance is provided to the driver in accordance with the course set, as mentioned above. Consequently, a problem is that if the driver should happen to err, say, at intersection and stray from the set course, travel in accordance with the guidance provided by the navigation apparatus will not be able to continue unless the vehicle is returned to the set course. Furthermore, a decision as to whether or not a predetermined intersection has been passed as specified by the course guidance is premised upon detection of travelled distance or a left or right turn as detected by a distance sensor or steering angle sensor, respectively. In actuality, however, detection of travelled distance and steering angle is susceptible to considerable error, which can cause errors in judgment.

The input method is one in which a transparent control panel mounted on the front of a CRT is pressed by a finger tip to make an input, as set forth in Japanese Patent Application Laid-Open No. 62-51000. Conventionally, the transparent control panel, e.g., an infrared touch panel, includes light-receiving and light-emitting elements mounted in horizontal and vertical directions, respectively, on the screen of the display unit. When the screen is pressed by a finger tip, pairs of elements between which light has been interrupted can be detected in the horizontal and vertical directions, whereby the position pressed by the finger tip is detected. However, if the conventional infrared touch panel described above displays a plurality of selectable item positions on its screen and such a position is designated by the operator's finger, the selected position cannot always be designated accurately. For example, there are instances where the detection area of a selectable item is not sufficiently large and finger thickness cannot be ignored, as when the screen is viewed from an angle or a plurality of selectable positions are arranged close together and a border portion between positions is designated, and there are also instances where, owing to use of a light-interruption method, a detection position cannot be specified at a point touched a distance away from a position touched first on the display screen, as when the operator's finger is moved on the screen.

In order to solve the foregoing problems, the applicant has filed a patent application (Japanese Patent Application No. 62-275095)) proposing a novel navigation apparatus which relies upon an explorer system instead of the above-described route matching system. In accordance with this system, the coordinates of a plurality of geographical points (e.g., intersections, landmarks, etc.) are set and a desired destination is entered, whereupon a course is sought from each geographical point to the desired destination and outputted as guidance information. Navigation is possible even if distance, steering angle and geomagnetic sensors should happen to fail or even if these sensors are not provided. As a result, if the driver strays from a course or changes the desired destination, the apparatus readily provides the driver with guidance to the destination. However, a system through which desired destination, point of departure, present position and the like can be inputted in simple fashion is an important problem.

SUMMARY OF THE INVENTION

The present invention solves the foregoing problems. In accordance with a first aspect of the invention, a reset switch is pressed when inputting a point of departure. As shown in FIG. 12, the following routine is executed whenever the reset switch is pressed: First, when an initial point of departure is entered by pressing the reset switch, the data are written in a non-volatile area of a RAM 9b, then destination input and course guidance are executed. When the destination is attained, destination arrival processing is executed and the destination data are set as departure-point data. When "RETURN" is selected at the time of a subsequent destination input, departure-point data are read in from the non-volatile area of the RAM 9b and these data are set as destination data. Accordingly, even if a plurality of destinations are traversed, the labor of entering a destination at the time of return can be eliminated. Further, if this arrangement is applied to a navigation system of the type in which course exploration for travel to a destination is provided at each geographical point and guidance information is outputted upon setting the coordinates of a plurality of geographical points (e.g., intersections and landmarks) and entering a destination, the labor involved in entering a destination at the time of return can be further curtailed.

In a second aspect of the invention, intersections adjacent to two intersections leading to, say, a previous guidance point or selected departure point, are retrieved. If the intersections are within a predetermined distance (e.g., 1 km) from the departure point and have intersection names, these are adopted as display intersections, a predetermined number (e.g., six) of the display intersections are displayed and it is possible to select these by a touch panel. Accordingly, the names of intersections within a predetermined range about the departure point are displayed on the display screen and a departure point can be selected from among them. As a result, the labor involved in making entry by code number as in the prior art can be eliminated, and entries can be made simply in one-touch fashion. In addition, even if a departure point is not an intersection, selection can be made by entering a code number. By adopting the departure point as an intersection, distance precision for pursuing the present position can be improved.

In a third aspect of the invention, there is provided a navigation apparatus in which, through a simple system arrangement, appropriate guidance information can be outputted at any geographical point without a course being fixed. For example, as shown in FIG. 30, if an input in Roman characters is made after an input screen is displayed, an input-character buffer is cleared, one Roman character is inputted and the character is stored in the input-character buffer. Next, names corresponding to the character string in the character buffer are selected from a Roman character sort list and displayed on a menu screen, and then an item in the menu is selected. If a selection can be made, the selected name data are read in and set in a predetermined area of a memory. Accordingly, when a destination is designated by destination designating means, guidance information for travel to a destination can be set at each and every geographical point by guidance information setting means. Thus, if the present location is entered as a guidance location by guidance location input means, guidance information for travel from this geographical point to the destination will be displayed on output means. As a result, after a destination is designated, guidance information can be obtained from any geographical point. In addition, after the present location is specified and entered, merely entering a trigger signal makes it possible to easily set the next geographical point as a guidance point in accordance with the guidance information for travel to the destination.

In a fourth aspect of the invention, there is made possible a selective input on a touch panel in an accurate manner. For example, as shown in FIG. 11, "SIGHTSEEING", "LODGINGS", "DINING", "SOUVENIRS", "CODE NO. INPUT", "RETURN" are displayed in red as selectable items, and a desired genre is selected by touch-panel input. The input display section is displayed entirely in the color red. Next, when a desired parking lot is inputted by the touch panel, a confirmation screen is displayed. Here the selected item is backlighted in, say, the color blue, while the other items appear in dark blue, so that the driver may easily confirm the selection made. Further, only confirmation keys "CANCEL" and "OK" are displayed in red. Accordingly, selective input on the touch panel can be performed in accurate fashion. By always causing the confirmation screen to be displayed before selecting a destination, it is possible to eliminate the danger of being guided to a different destination and destinations can be entered accurately.

BRIEF DESCRIPTION OF THE DRAWINGS

FIG. 6 is a table illustrating node series data;

FIG. 7 is a table illustrating intersection data;

FIG. 8 is a table illustrating destination data;

FIGS. 11(a), 11(b), 11(c), 11(d), 11(e), 11(f) and 11(g) are views of examples of display screens in the destination input of FIG. 10;

FIGS. 14(a) and 14(b) are views of examples of display screens in the departure-point input of FIG. 13;

FIG. 17 is a table of intersection data of the map of FIG. 16;

FIG. 18 is a table of road data of the map of FIG. 16;

FIGS. 22 and 23 are views of screen displays in the departure-point input method of FIGS. 19-21;

FIG. 25(a) is a table illustrating a region name list used in the apparatus of FIG. 24;

FIG. 25(b) is a table illustrating a landmark list used in the apparatus of FIG. 24;

FIG. 25(c) is a table illustrating a region name frequency list used in the apparatus of FIG. 24;

FIG. 25(d) is a table illustrating a landmark frequency list used in the apparatus of FIG. 24;

FIG. 26(a) is a table illustrating a roman character sort file used in the apparatus of FIG. 24;

FIG. 26(b) is a table illustrating a hiragana sort file used in the apparatus of FIG. 24;

FIG. 26(c) is a table illustrating an intersection file used in the apparatus of FIG. 24;

FIG. 29(a) is a view of a display screen for code number input;

FIG. 29(b) is a view of a display screen for destination selection from a menu;

BEST MODE FOR CARRYING OUT THE INVENTION

An embodiment of the invention will now be described with reference to the drawings.

Figure 1:
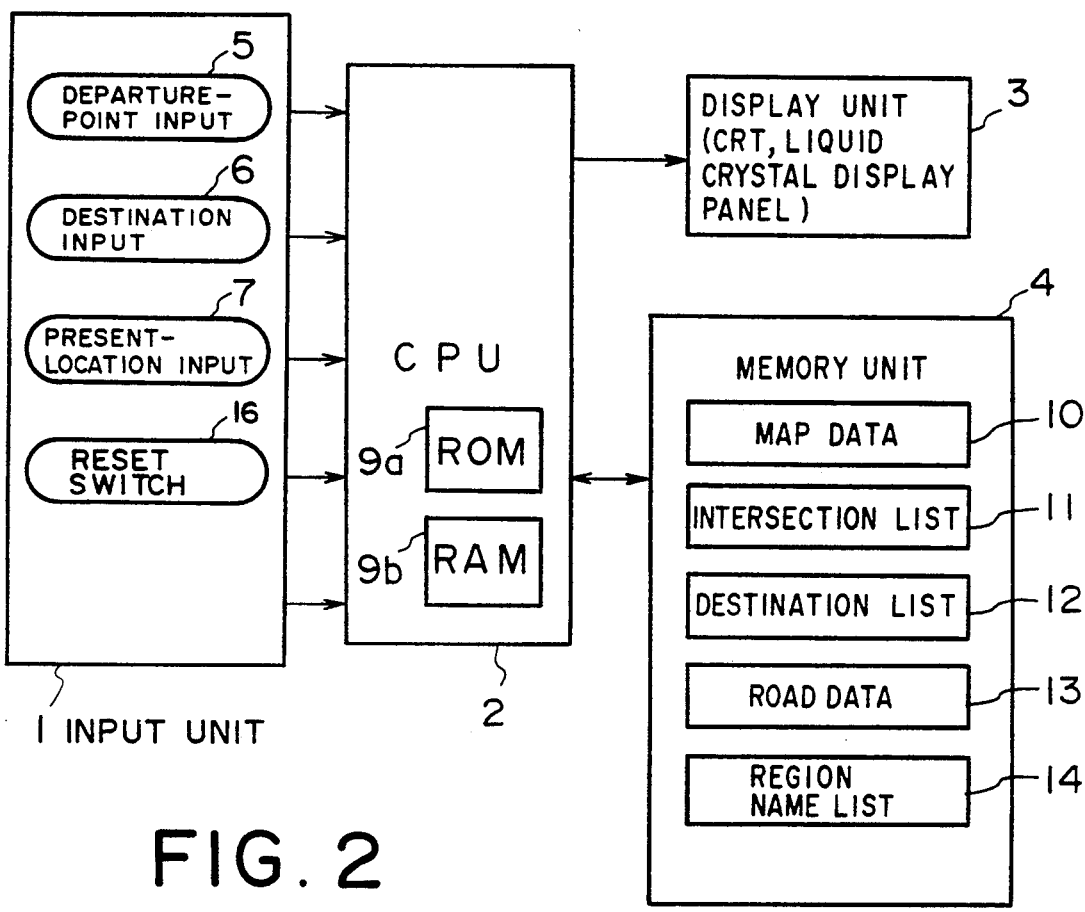
FIG. 1 is a diagram of a navigation apparatus according to one embodiment of the invention.

Shown in FIG. 1 are an input unit 1, a CPU 2, a display unit 3 such as a CRT or liquid crystal display panel, and a memory unit 4. The input unit 1 is provided with input means for departure-point input 5, destination input 6, present-position input 7 and trigger input 8, these inputs being made by keyboard, touch panel, light pen, mouse or voice input. The memory unit 4 is a memory such as a CD-ROM in which network data indicative of geographical points, namely desired destination and present position, and other information are stored in advance. As will be described below, map data 10, a list 11 of intersections, a list 12 of destinations, road data 13 and a list 14 of region names are stored.

When a destination is designated by an input from the input means 1, the CPU 2 performs an exchange with a program, stored in a ROM 9a, in order to set information for travel to the destination, by a method such as course exploration, in accordance with each geographical point stored in the memory unit 4. The CPU stores this information in a memory such as a RAM 9b.

In the present embodiment, the RAM 9b is provided with a non-volatile area for storing departure-point data (east longitude, north latitude, etc.). When an input is made by a reset switch 16 in entering a departure point, the data in this non-volatile area can be rewritten. Data written in are preserved until the reset switch is pressed again and a geographical point is entered. Data will not be erased even if an ignition switch is turned off.

Figure 2:
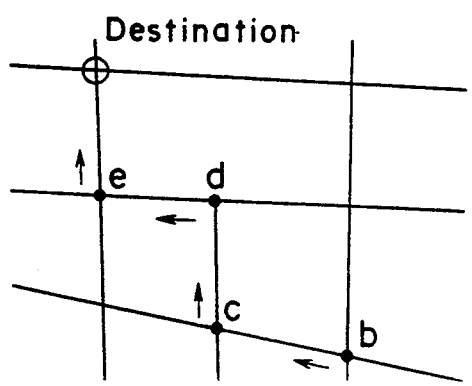
FIG. 2 is a map diagram illustrating one example of a route sequence.

When present-position information is entered by the input means 1, the display unit 3 outputs guidance information for this point. If only intersections serve as geographical points, the outputted guidance information is that for travel to the next intersection, such as an indication of a left or right turn, at the intersection serving as the guidance point. In a case where there is a second intersection encountered immediately after turning at the aforementioned next intersection, it is of course possible for the outputted guidance information to include the direction of the first turn along with information designating the proper lane to take after the turn, as well as the direction of the second turn and the associated guidance information. For example, the display unit can output guidance information relating to a course leading to a desired destination in accordance with the path sequence a, b, c, . . . shown in FIG. 2.

Figure 3:
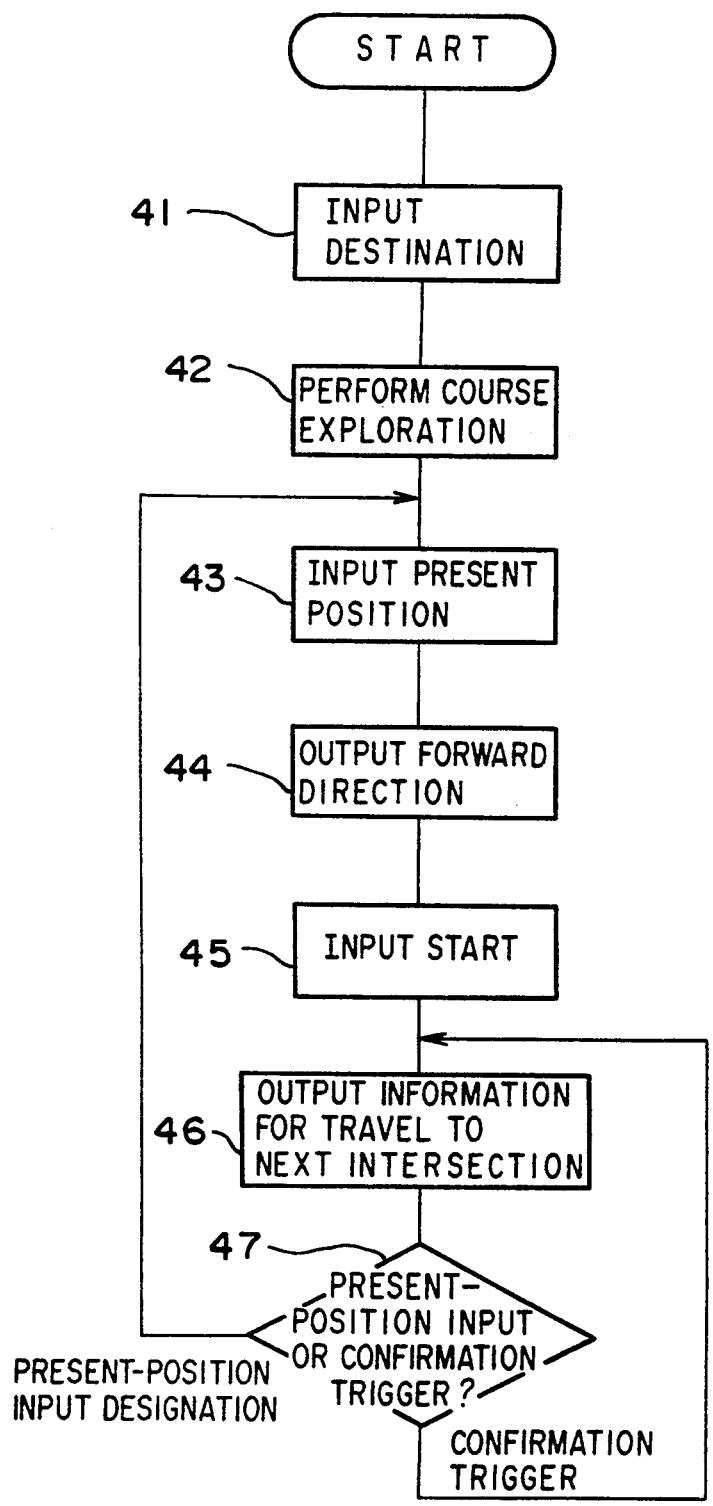
FIG. 3 is a flow chart of navigation processing of the apparatus of FIG. 1.

The flow of processing associated with the present embodiment will now be described with reference to FIG. 3.

When the driver enters the code of a desired destination (step 41), a course search mode is established in which information for travel to the desired destination is set for all geographical points with the exception of the entered desired destination (step 42). When course search ends, a present position input mode is established, in which the driver inputs the code of his present position (step 43). When this is done, the direction of forward travel from this position is outputted (step 44). Next, when the driver inputs an intersection verification trigger start input, (step 45), information for attaining the destination at the next intersection is outputted (step 46). Next, monitoring is performed (step 47) to see whether the intersection verification trigger or a signal from a present-position input button has been entered. If the intersection verification trigger has been entered, the program returns to the processing of step 46. If the signal from the present-position input button has been entered, the program returns to the processing of step 43. In other words, in accordance with this system, a trigger is inputted each time an intersection is verified providing that the vehicle is travelling as per instructions. If the vehicle strays from the instructed course and the driver notices this only after the vehicle has travelled to another intersection, the present-position input button is pressed. Accordingly, whenever a trigger is inputted, guidance information relating to an intersection on a route leading to the desired destination is outputted in sequential fashion. When the present-position input button is pressed, the present position input mode is established.

Figure 4:
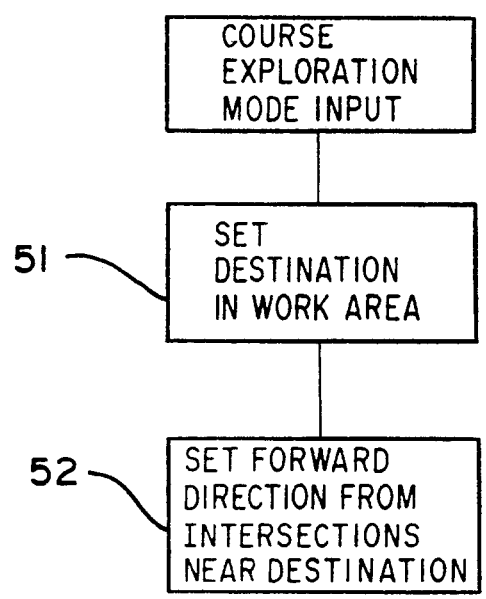
FIG. 4(a) is a flow chart of course search processing.
FIG. 4(b) is a map diagram illustrating the process of FIG. 4(a)
Figure 4:
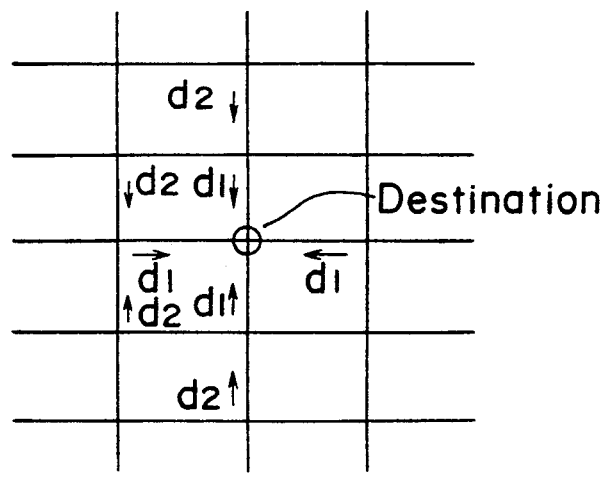

The course search processing of step 42 will now be described. When the course exploration input mode is established, as shown in FIG. 4(a), first the desired destination is set in a work area (step 51), after which forward directions from intersections near the destination are set (step 52). As shown in FIG. 4(b), the set forward directions include forward directions $d_1$ at intersections before the destination, and forward directions $d_2$ at intersections before the first-mentioned intersections. It is permissible to execute this course search after the processing of step 43 in FIG. 3, in which case course search would be performed whenever present position is inputted. Furthermore, since guidance information is outputted in response to the trigger input in accordance with the route set as a result of course search, the pertinent intersections are limited in number. Accordingly, it will suffice to provide guidance information solely for the minimum number of intersections.

The abovementioned destination or present-position input method will now be described with reference to FIGS. 5 through 11.

FIGS. 5 through 9 illustrate the structure of data in accordance with the invention.

Figure 5:
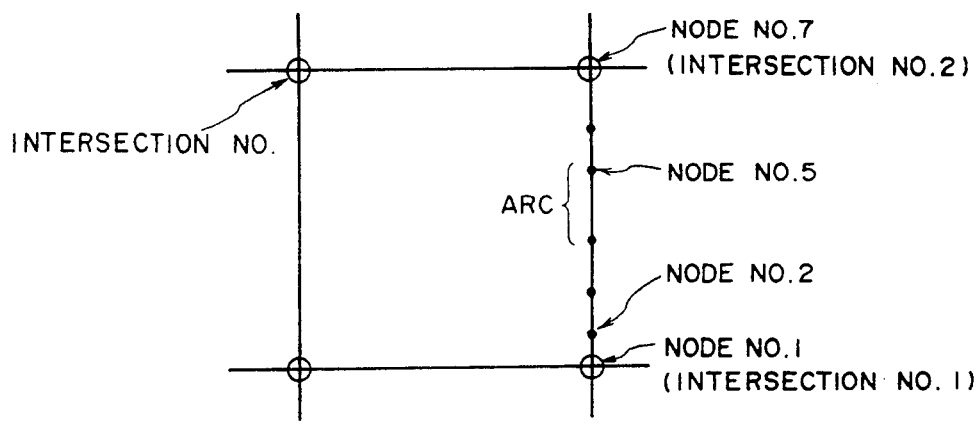
FIGS. 5(a) and 5(b) are map diagrams illustrating types of data according to the invention.
Figure 5:
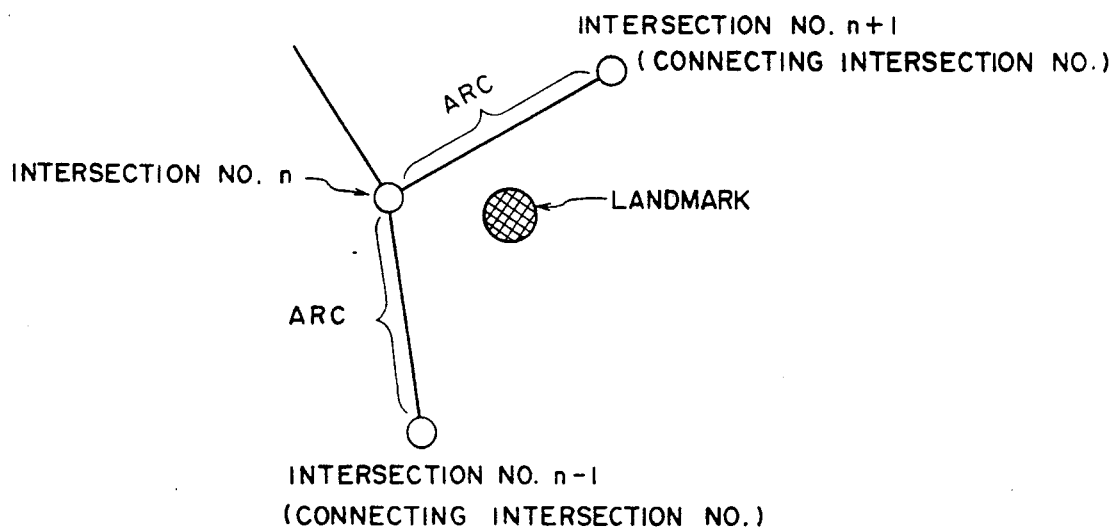
Figure 9:
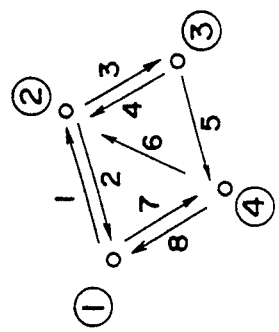
FIG. 9(a) is a table illustrating road data.
FIG. 9(b) is a map diagram showing data of FIG. 9(a)

FIG. 5 is a diagram useful in describing the fundamental approach adopted in forming map data. As shown in FIG. 5(a), a map is not construed merely as intersections but also includes nodes, which are points having useful guidance information (e.g., bridges, rivers, buildings, gasoline stations, etc.) at geographical points between intersections. Thus, nodes indicate point data representing map coordinates, and some of the nodes are intersections. Arcs indicate line data and represent portions of the roads. By adopting such an arrangement, a landmark serving as useful guidance information can be provided as data between roads (i.e., between two arcs) connecting node numbers on either side of a node number n of an intersection depicted in FIG. 5(b).

FIG. 6 illustrates node series data. What is stored are east longitude and north latitude, namely the coordinates of the pertinent geographical point, for each node number, as well as the attribute which distinguishes the effective guidance information (e.g., bridges, rivers, buildings, gasoline stations) as data for each node number.

FIG. 7 illustrates an example of an intersection list, in which there are stored the node numbers of the intersections, the intersection names, the intersection numbers (numbers assigned only to those of the nodes that are intersections), the node numbers of two connecting nodes, as described above with reference to FIG. 5(b), the names of landmarks and attributes.

FIG. 8 illustrates an example of a destination list, in which there are stored code numbers, the names of destinations, parking lot numbers, the numbers of two connecting intersections connecting a desired destination, the directions of parking lots (whether a parking lot is on the left or right side of a road or straight ahead), the numbers of photographs of connecting intersections, the numbers of photographs of parking lot exits, block data for each region, and coordinates (east longitude, west latitude). The arrangement is such that the attribute of each desired destination is distinguishable by genre. For example, the following numbers can be assigned to the most significant bit of code number to indicate genre: 0 (sightseeing), 1 (public facility), 2 (lodgings), 3 (dining), 4 (place of business), 5 (gasoline station), 6 (intersection), 7 (parking lot), 8 (souvenirs), and other attribute data can be provided if desired. These desired destination data indicate parking areas near the desired destinations. If a desired destination is a parking lot, the driver is informed of the connecting intersection numbers, the direction of the parking lot (whether it is on the left or right side of a road or straight ahead), the photograph numbers of the connecting intersections and the photograph numbers of the parking lot exit. Thus, the driver is guided in positive fashion until the vehicle arrives at its final destination.

FIG. 9(a) illustrates an example of road data. As shown in FIG. (b), each road is assigned a road number(s) along with the direction(s) of traffic flow. The stored road data include, for each road number, the node numbers of starting and end points of the road, the number of a road having the same starting point, the number of a road having the same end point, road width, information relating to prohibitions, information relating to guidance not required (as when the driver need only continue travelling straight ahead), photograph numbers, the numbers of nodes, the leading addresses of node series data, etc.

Destination input will now be described with reference to FIGS. 10 and 11.

Figure 10:
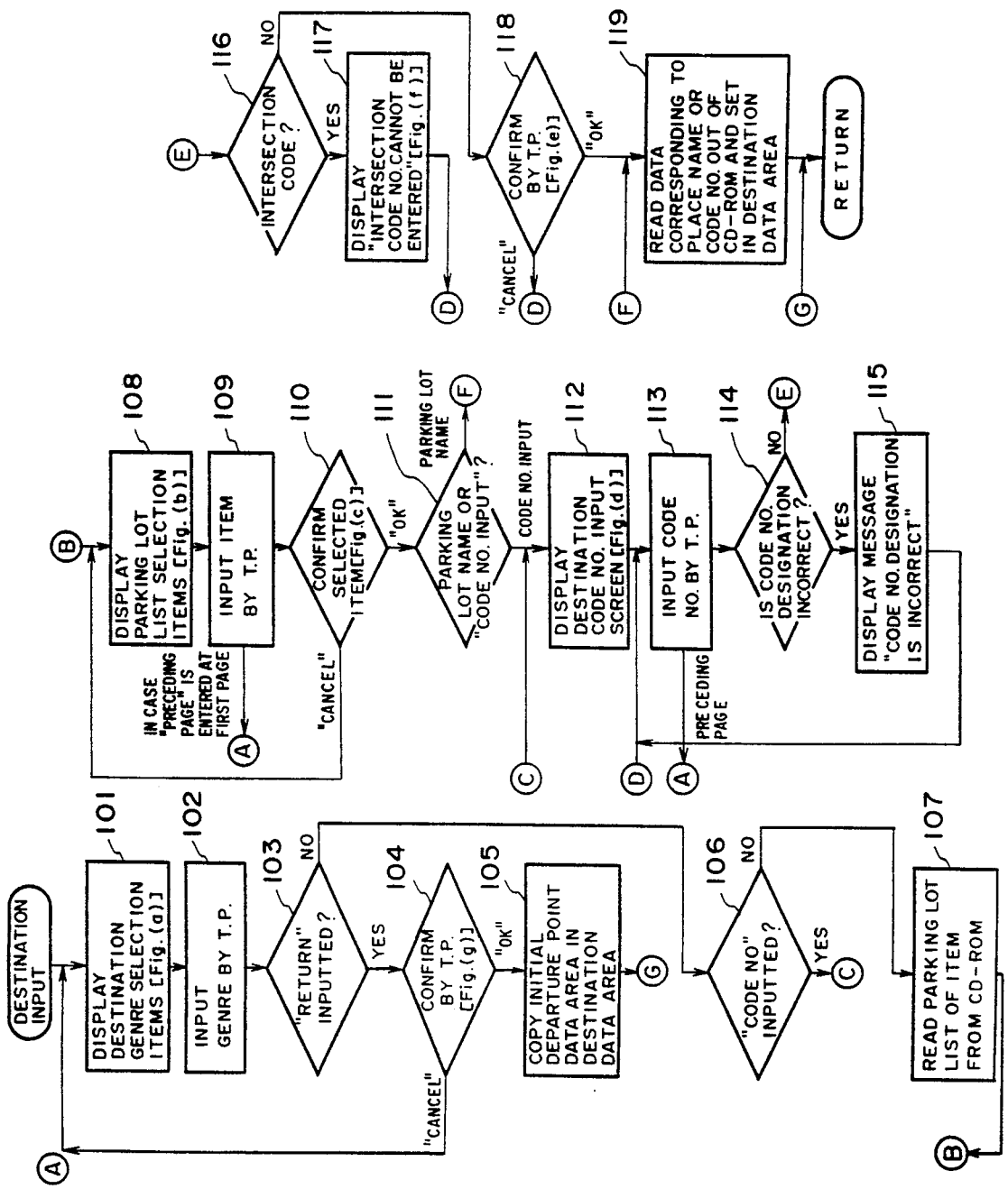
FIG. 10 is a flow chart showing an example of a destination input method.

FIG. 10 is a flowchart of the associated processing. A step 101 calls for the screen shown in FIG. 11(a) to be displayed as a desired destination input. This screen is for indicating the genre of the destination. Items which appear frequently, such as "SIGHTSEEING", "LODGINGS", "DINING", "SOUVENIRS", "CODE NO. INPUT", "RETURN" are displayed in red as selectable items, and a genre is selected by touch-panel input at step 102. Next, it is determined at step 103 whether "RETURN" on the screen of FIG. 11(a) has been inputted. If the answer is NO, it is determined at step 106 whether "CODE NO." has been inputted. If the answer received here is YES, then the program proceeds to step 112.

If a NO answer is received at step 106, the program proceeds to step 107, at which a list of parking lots (destinations) for the selected item are read in from the CD-ROM, whereupon the screen shown in FIG. 11(b) is displayed (step 108). At the same time, a voice track "SELECT YOUR DESIRED DESTINATION" is played. Here also items are displayed in the order of their frequency. By touching a "PRECEDING PAGE" or "NEXT PAGE" key, destination parking lots can be selectively designated. All of the input display sections are displayed in the color red. The last item in the display is the "CODE INPUT NO. INPUT" item. If "PRECEDING PAGE" is entered at the first page, the program returns to step 101.

When a desired parking lot is inputted by the touch panel (step 109), a confirmation screen shown in FIG. 11(c) is displayed at step 110. Here the selected item is backlighted in, say, the color blue, while the other items appear in dark blue, so that the driver may easily confirm the selection made. If "CANCEL" is pressed, the program returns to step 108. If OK is pressed, it is determined at step 111 whether the name of a parking lot has been inputted or a code number. If the name of a parking lot is the desired destination, the program proceeds to step 119, where data corresponding to the name of the parking lot are read from the CD-ROM and set in the memory area of the CPU.

Figures 11D, 11E, 11F, 11G:
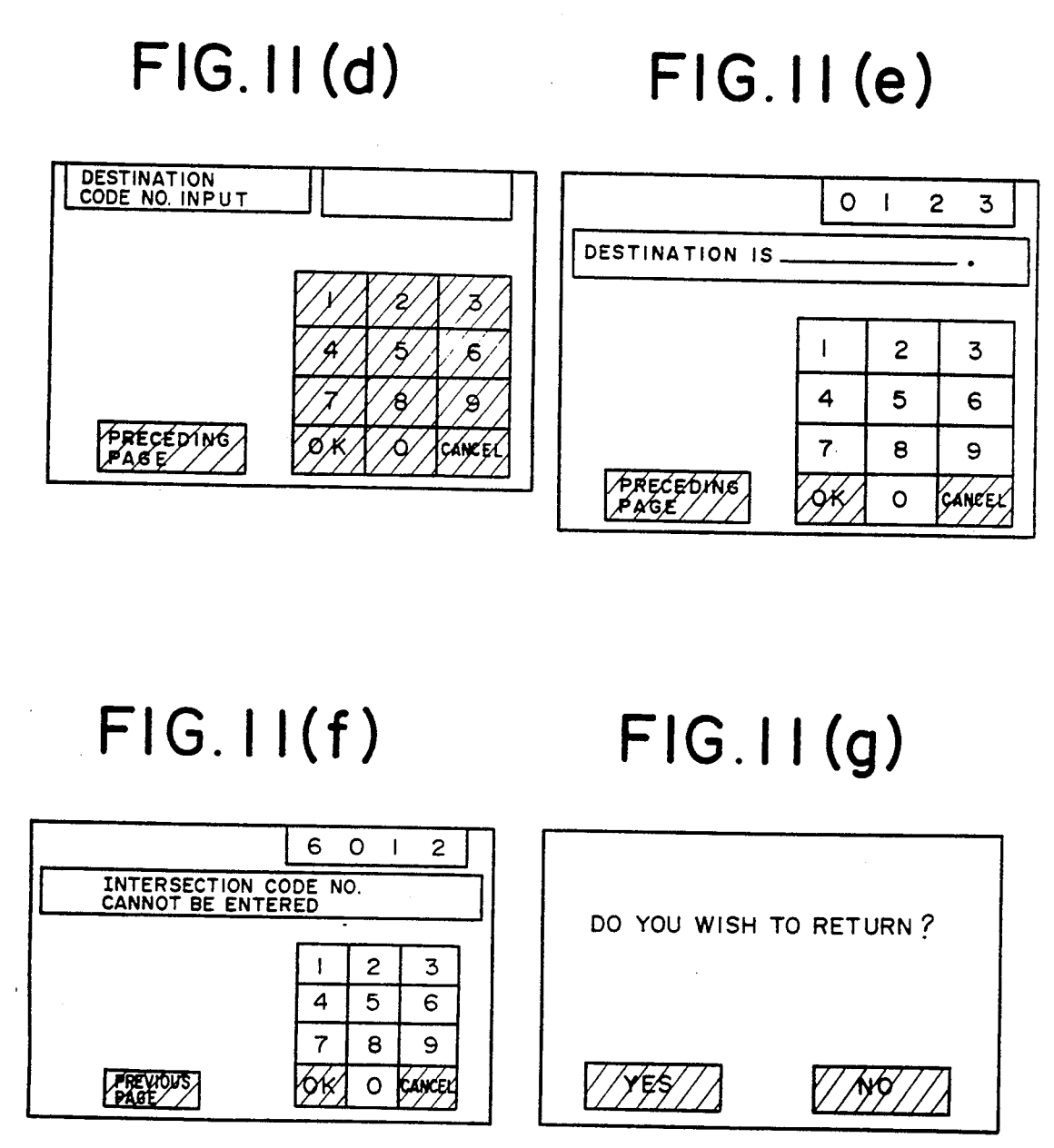

When a change is made in the code number input at step 111, or when code number input is selected at step 106, a code number input screen shown in FIG. 11(d) is displayed at step 112, after which a desired parking lot code number is inputted from the touch panel at step 113. It is then determined at a step 114 whether the code number designation is incorrect. If it is, step 115 calls for display of a message reading "CODE NO. DESIGNATION IS INCORRECT" and the program returns to step 113. If the code number designation is correct, then it is determined at step 116 whether the code number is an intersection code. If it is not an intersection code, the program proceeds to step 118, at which the desired destination is displayed automatically, as shown in FIG. 11(e). If the "OK" key is pressed, the program proceeds to step 119, at which data corresponding to parking lot name are read out of the CD-ROM and set in the memory area of the CPU. The program returns to step 113 if "CANCEL" is pressed.

If the code number designated at step 116 is indicative of an intersection, a message reading "INTERSECTION CODE NO. CANNOT BE ENTERED", which is shown in FIG. 11(f), is displayed at step 117 and the program returns to step 113. When "RETURN" is inputted at step 101 in execution of the above routine, the screen of FIG. 11(g) is displayed through steps 103, 104. If the driver presses "OK", the initial departure-point data are copied in the desired destination storage area (step 105).

Figure 12:
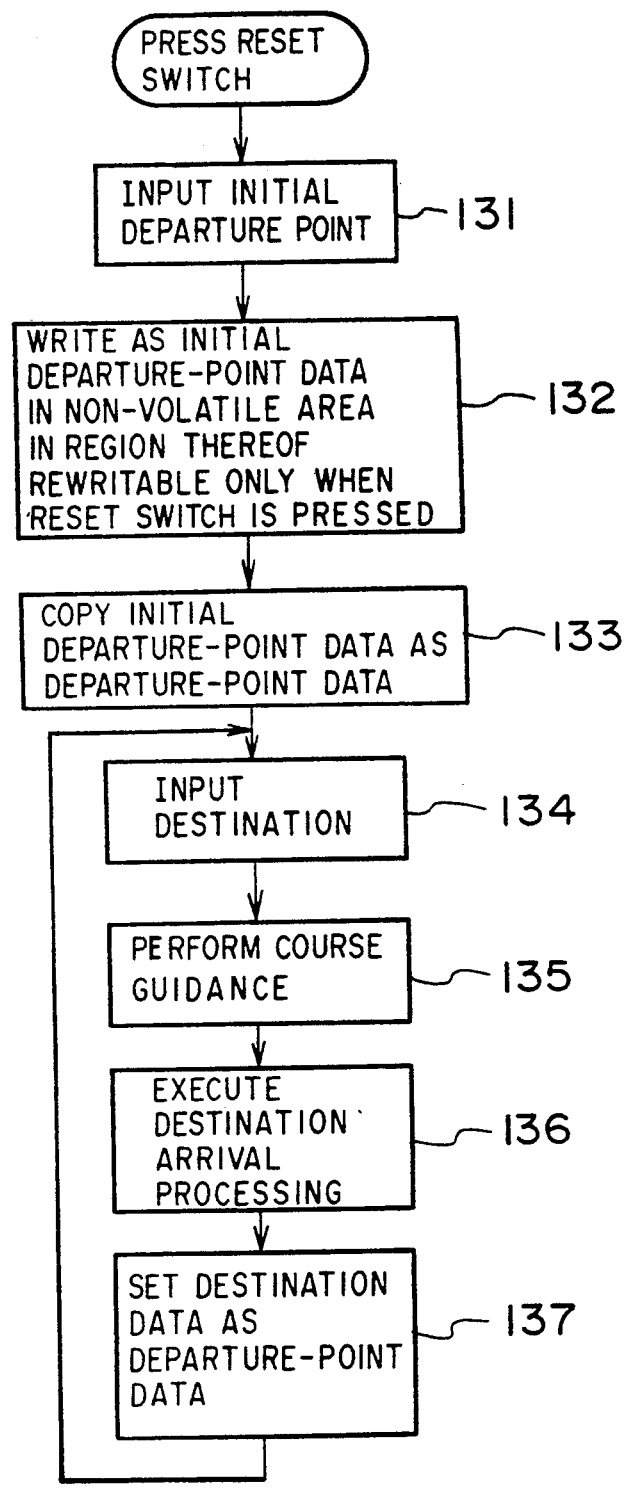
FIG. 12 is a flow chart of navigation processing after operation of reset switch.

Reference will now be made to FIG. 12 to describe flow when the reset switch characterizing the present invention is pressed. The reset switch is pressed when inputting a point of departure. The following routine is executed whenever the reset switch is pressed: First, when an initial point of departure is entered in a case where the reset switch is pressed, the data are written in a non-volatile area of the RAM 9b in a region thereof rewritable as initial departure-point data only when the reset switch is pressed, and these data are written in also as working departure-point data (steps 131-133). Next, destination input and course guidance are executed (steps 134, 135). When the destination is attained, destination arrival processing is executed (step 136 and steps 103, 104 in FIG. 10) and the destination data are set as working departure-point data. When "RETURN" is selected at the time of a subsequent destination input, the data in the RAM 9b are read in and these data are set as destination data (step 137 and step 105 in FIG. 10).

Figure 13:
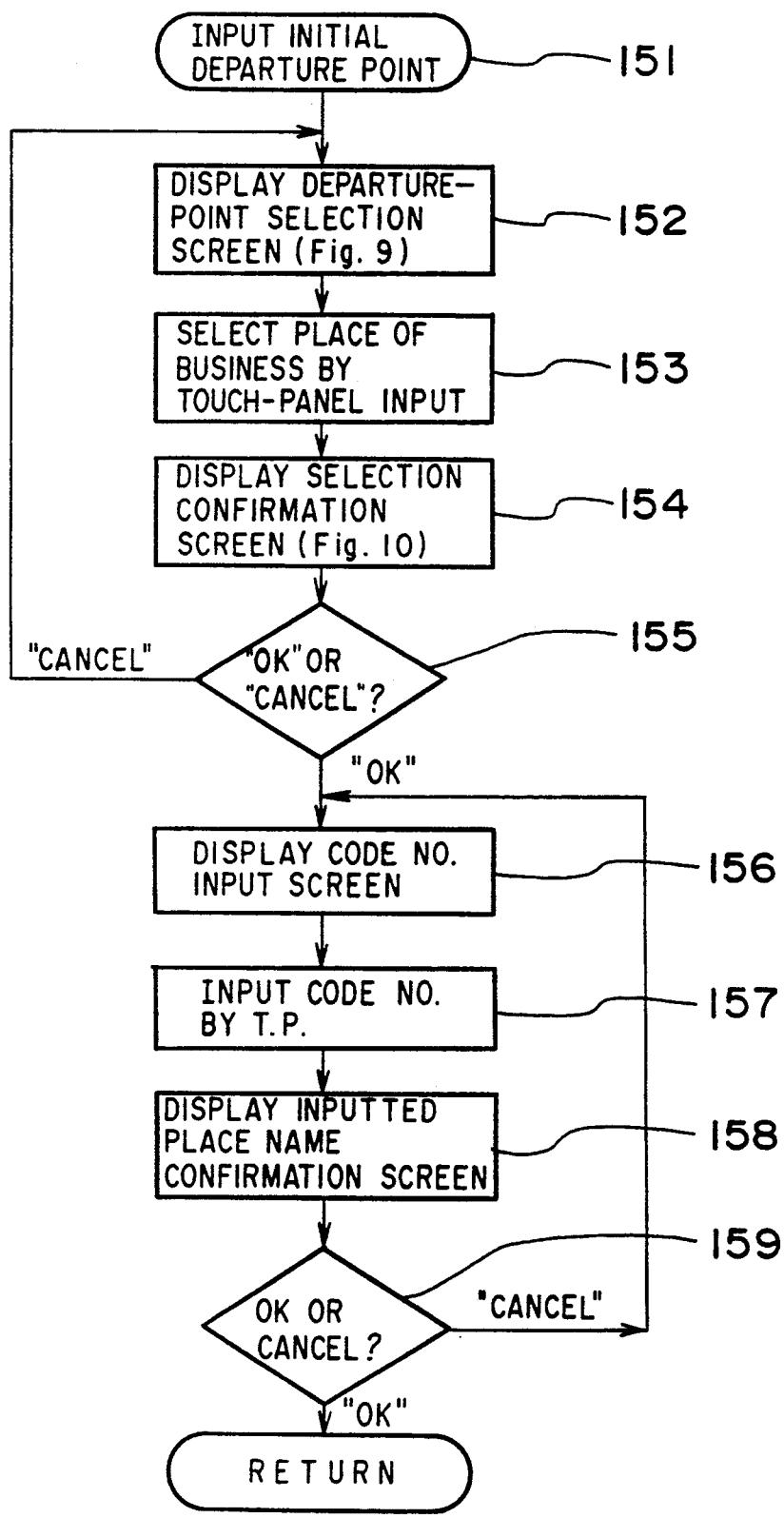
FIG. 13 is a flow chart of departure-point input processing.
Figure 15:
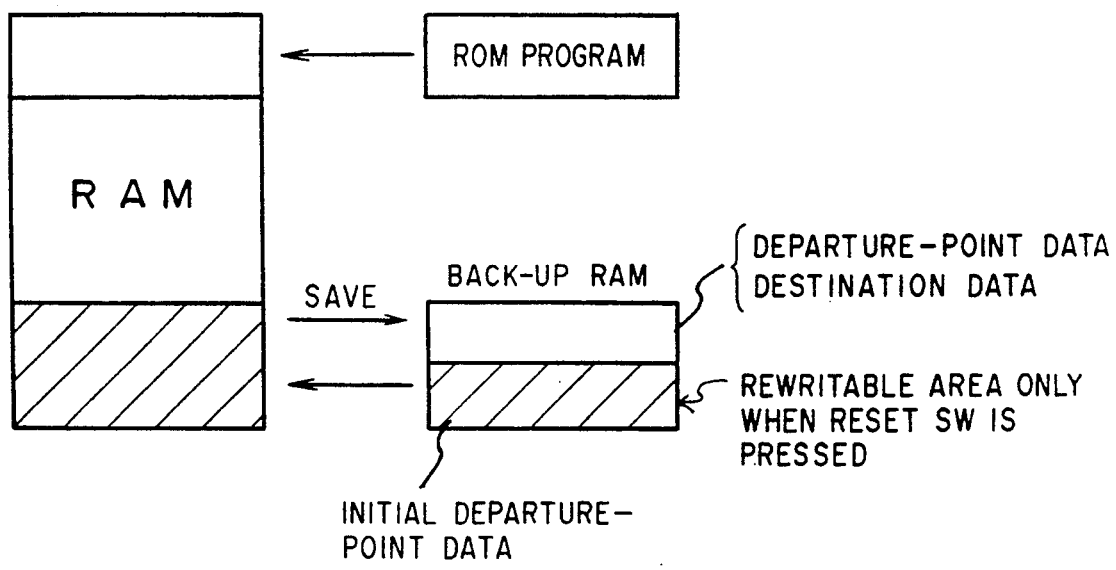
FIG. 15 is a diagram of CPU memory storage areas.

FIG. 13 illustrates the flow of processing for the initial departure-point input of FIG. 12. The departure-point selection screen shown in FIG. 14 is displayed at step 152. When a place of business (imagine that this is a car rental business) is selected by an input from the touch panel (step 153), a selection confirmation screen display is outputted at step 154, as shown in FIG. 14(b). If "OK" is entered at step 155, the code-number input screen is displayed, just as in FIGS. 11(d) and (e), a code number is entered by the touch panel and a screen for confirming the name of the entered location is displayed (steps 156-158).

In the foregoing embodiment it is of course possible to enter the present location as the initial departure point, and it is also possible to alter a destination at any time.

Input of departure point in the present invention will now be described in conjunction with FIGS. 16 through 23.

Figure 16:
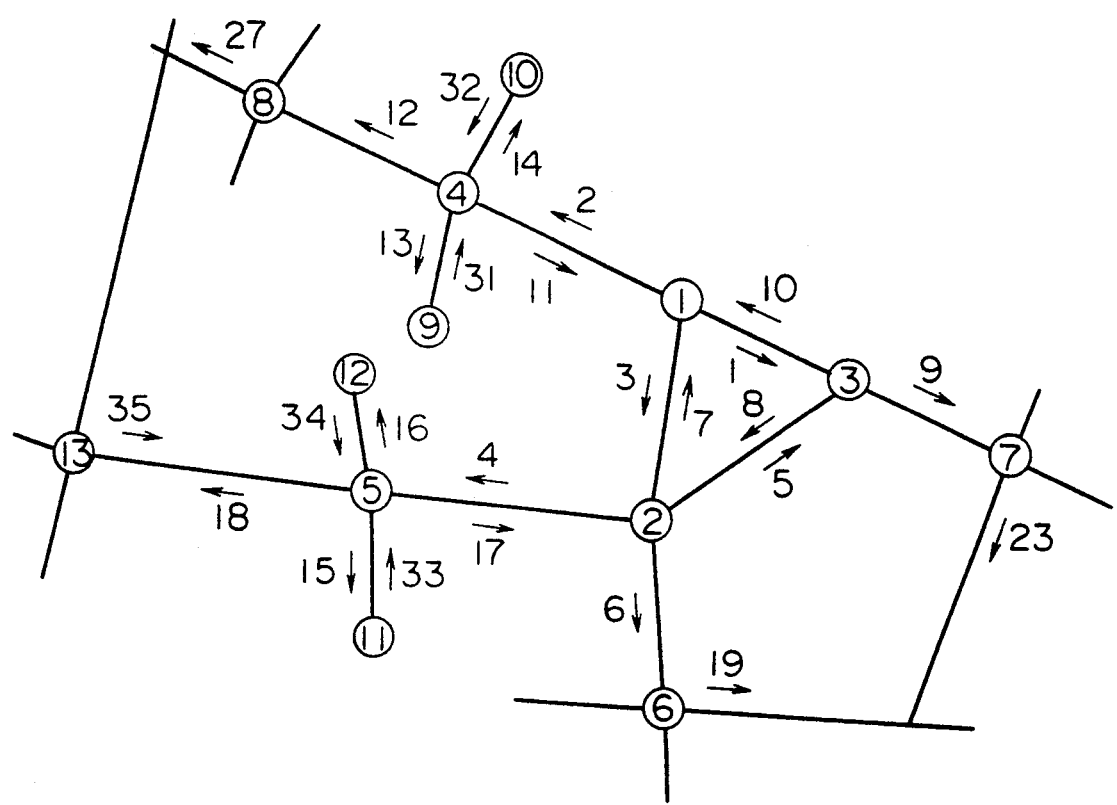
FIG. 16 is a map diagram of a road network.

FIGS. 16 through 18 illustrate another example of the structure of data, in which FIG. 16 illustrates network data having numbers assigned to roads and intersections. As shown in FIG. 17, the intersection data include, in correspondence with each intersection, positional coordinates (east longitude, north latitude), the smallest road number of the roads exiting the intersection, the intersection number of a block alongside, the number of roads exiting and the intersection name. In the present embodiment, the network data are divided into a number of blocks. Therefore, if an intersection crossing into an adjacent block exists and the vehicle makes a transition to the adjacent block, the abovementioned intersection number of the block along side will be necessary.

FIG. 18 illustrates road number data. Stored in correspondence with each road number are the number of the intersection which is the end point and the next road number having the same starting point. It should be noted that the intersection list 12 shown in FIG. 1 stores a correlation table of intersection numbers, code numbers and intersection names, and the destination list 13 stores code numbers, destination names, parking lot numbers, the numbers of two intersections connected to a destination (the destination being set between two intersections), positional coordinates and the like.

A method of entering point of departure in the navigation apparatus of the invention will now be described in accordance with FIGS. 19 through 21.

Figure 19:
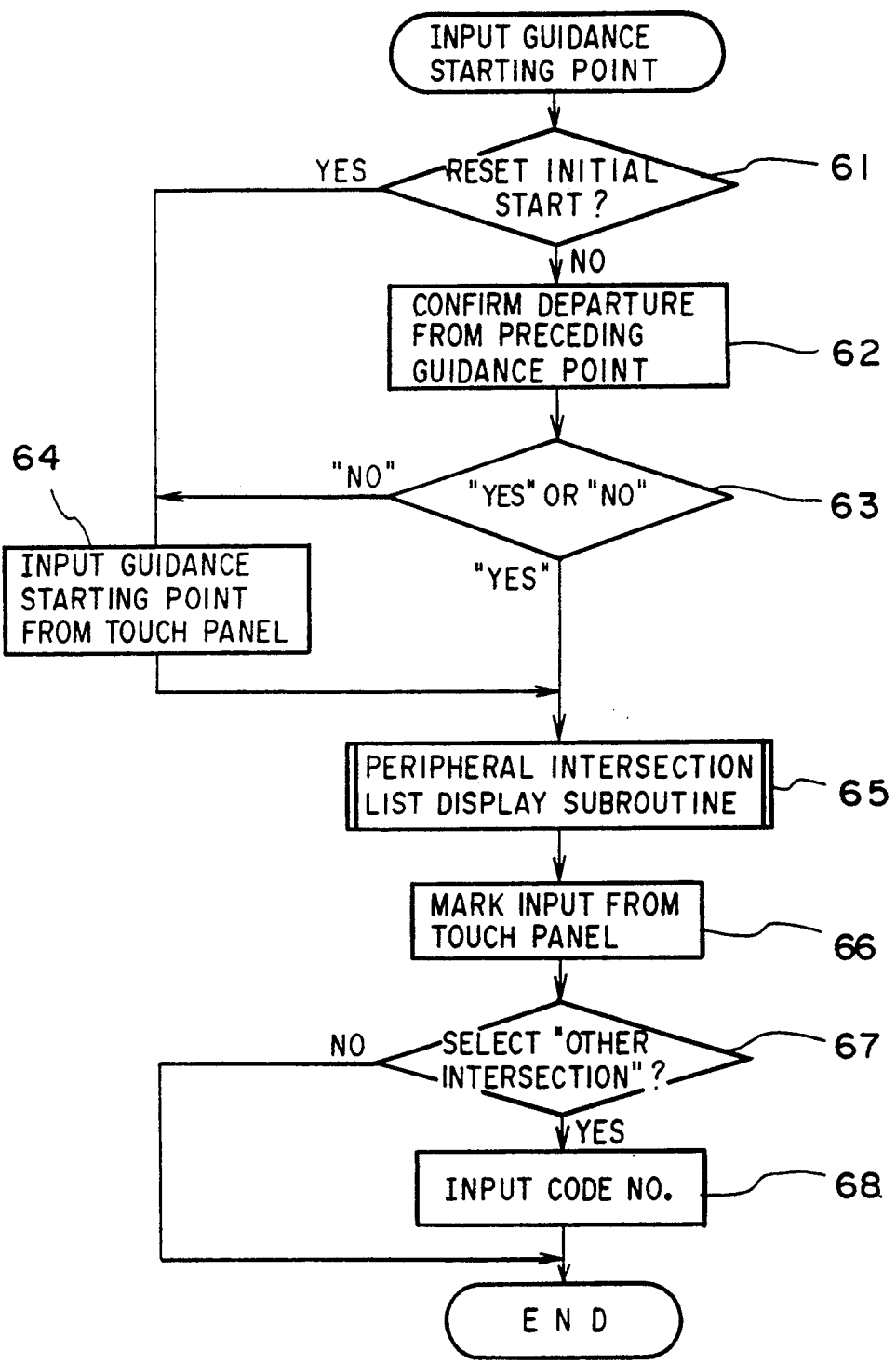
FIG. 19 is a flow chart of a departure-point input method.

FIG. 19 illustrates the main flow. First, at step 61, it is determined whether an initial start is made after reset. In case of initial start, guidance starting point based on code number is entered by the touch panel or the like at step 64. If this is not initial start after reset, the screen shown in FIG. 22 is displayed and it is verified by the touch panel whether the present location is near the previous location (destination) at step 62. If "NO" is touched on the screen of FIG. 22 at step 63, the program proceeds to step 64. If "YES" is touched, the processing of a routine for displaying a peripheral intersection list is executed at step 65, and a screen of intersections with assigned names shown in FIG. 23 is displayed. Next, at step 66, a touch-panel input is made on the screen of FIG. 23. At step 67, it is determined whether "OTHER INTERSECTION" has been selected. If it has not been selected, processing ends; if it has, the departure point is entered by code number.

Figure 20:
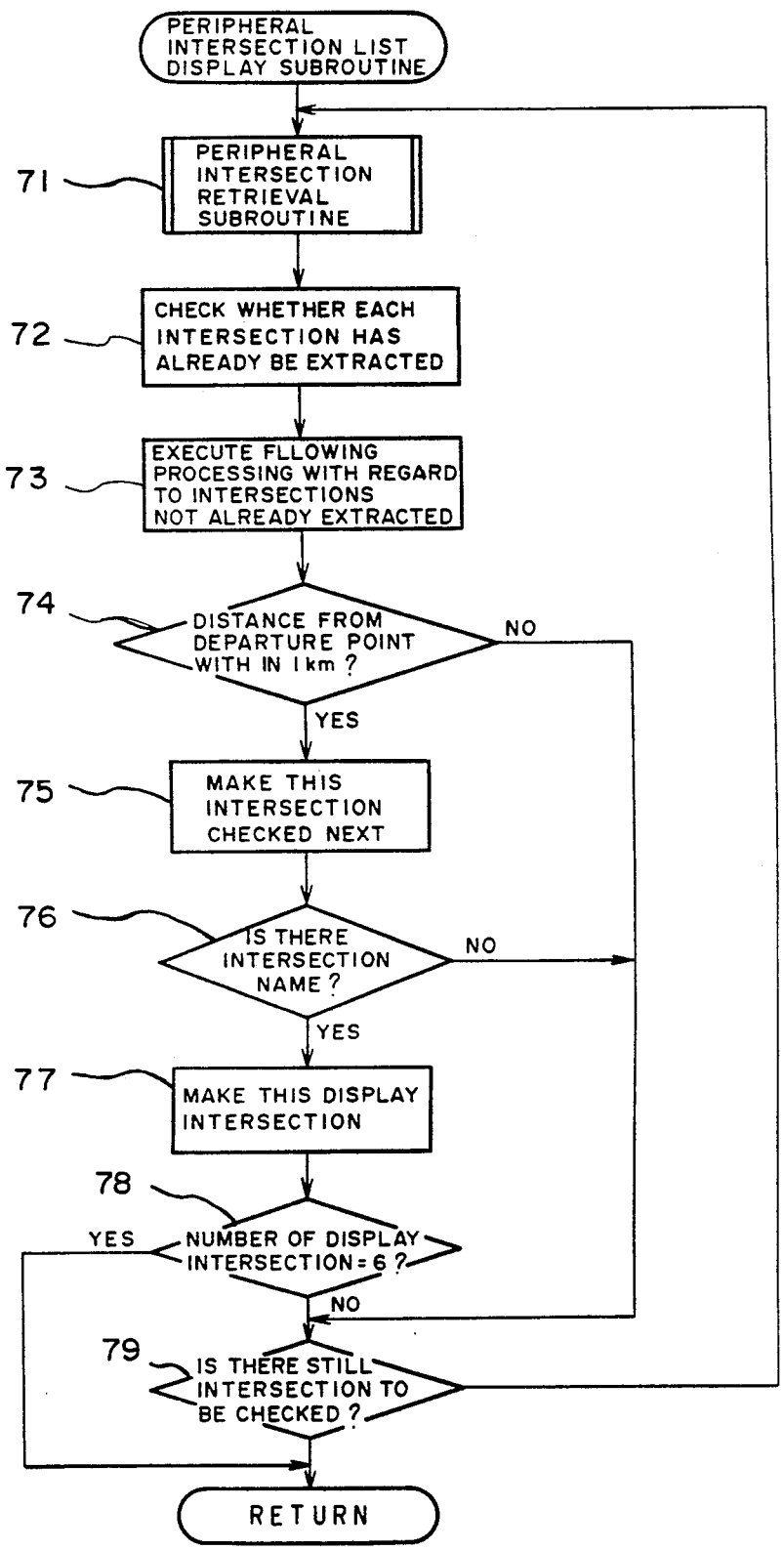
FIG. 20 is a flow chart of a peripheral intersection list display subroutine in the departure-point input method of FIG. 19.

FIG. 20 illustrates the processing of the routine of step 65 for displaying the peripheral intersection list.

First, a peripheral intersection retrieval subroutine is executed at step 71. As will be described below, this is processing for retrieving intersections adjacent to two intersections $K_1$, $K_2$ leading to the preceding guidance point or a selected point of departure. Next, at steps 72, 73, it is checked to determine whether each of the retrieved intersections has already been extracted. The following processing is executed with regard to an intersection that has not already been extracted. Specifically, it is determined at step 74 whether the intersection is within a predetermined distance (e.g., 1 km) of the point of departure. If the answer is "NO", the program jumps to step 79. If the intersection is within the predetermined distance, this is adopted as an intersection $K_3$ to be investigated next in step 75. Then, at step 76, it is determined whether the intersection $K_3$ has an intersection name. If it does not have an intersection name, the program jumps to step 79; if it does, this intersection is made a display intersection $C_1$ in step 77 and, at step 78, it is determined whether the number of display intersections is a predetermined number (e.g., six). If the number of intersections is not a predetermined number, it is determined at step 79 whether there is still an intersection to be checked. If there is, then the foregoing processing is repeated. The program returns when the number of display intersections reaches the predetermined number or when there are no longer intersections to be checked.

Figure 21:
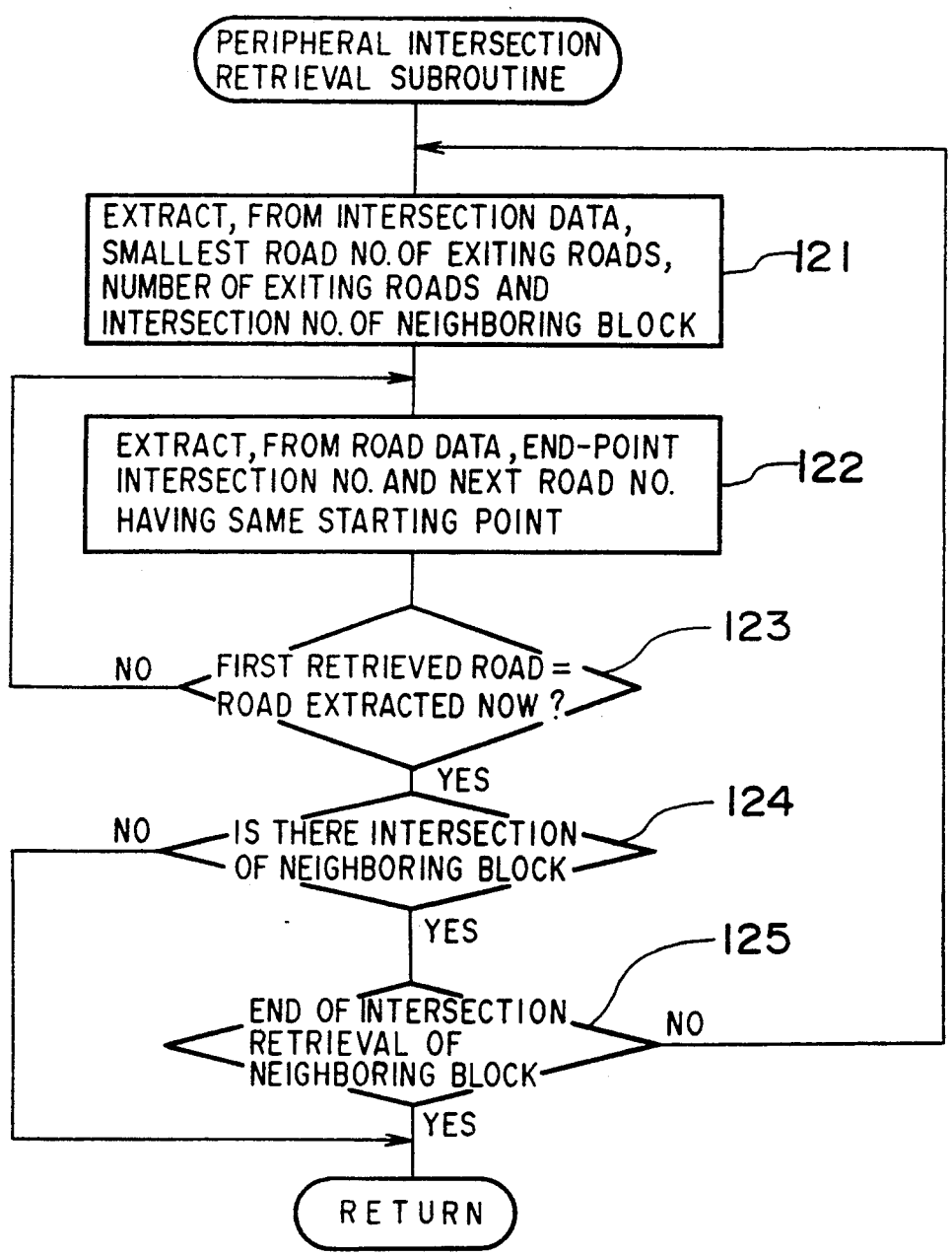
FIG. 21 is a flow chart of a peripheral intersection retrieval subroutine in the peripheral intersection list display subroutine of FIG. 20.

FIG. 21 illustrates the processing of the subroutine of step 71 for retrieving peripheral intersections.

For example, of the two intersections $K_1$, $K_2$ leading to the preceding guidance point or selected point of departure, assume that $K_1$ has the intersection numbers 1,2 indicated by the intersection data of FIG. 17. In such case, the smallest road number 1 of the roads exiting the No. 1 intersection and the number of roads 2 exiting the intersection are obtained at step 121. Next, at step 122, there are obtained from the road data of FIG. 18 the end point intersection number 3 of the abovementioned road number 1 and the next road number 2 having the same starting point, whereby there is obtained the end point intersection 2. It is then determined at step 123 whether the initially retrieved road and the road retrieved now are the same, namely whether all roads in a block exiting the intersection have been retrieved. If, when all roads have been retrieved, there is an intersection in an adjacent block, this intersection is retrieved and the foregoing processing is repeated, whereby intersections connected to intersection $K_1$ are retrieved (steps 124, 125).

Another embodiment of the invention will now be described in accordance with FIGS. 24 through 31.

Figure 24:
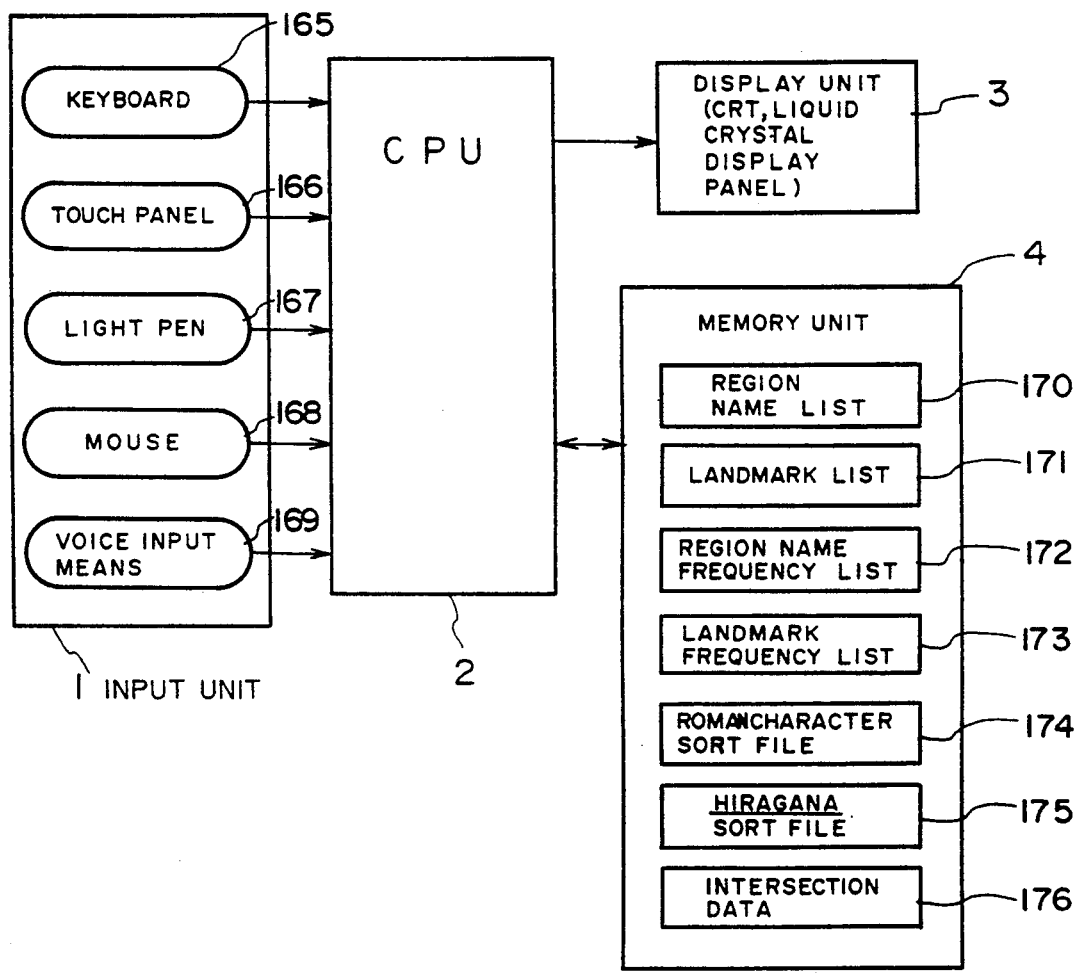
FIG. 24 is a diagram of a navigation apparatus according to another embodiment of the invention.
Figure 27A:
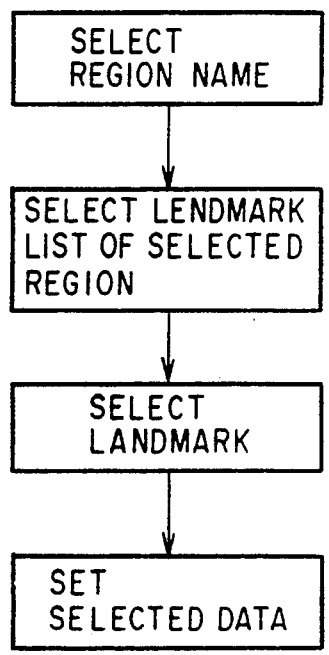
FIG. 27(a) is a flow chart of a present-position input method using landmark selection by region.
Figure 27B:
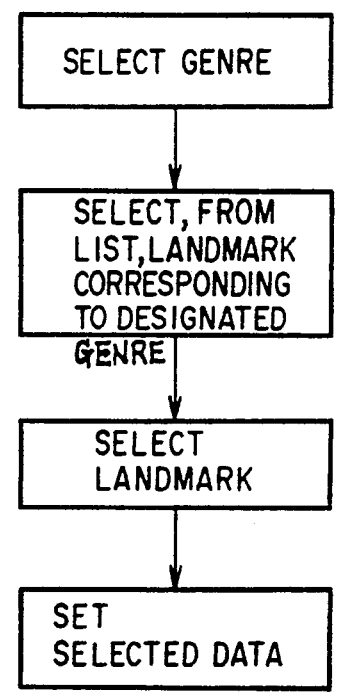
FIG. 27(b) is a flow chart of a present-position input method using landmark selection by genre.

In FIG. 24, there are shown input means 1, a CPU 2, a display unit 3 such as a CRT or liquid crystal display panel, and a memory unit 4. A keyboard 165 comprises a ten-key pad and function keys for inputting code numbers of predetermined geographical locations, such as a desired destination and present position (guidance point). A touch panel 166, light pen 167, mouse 168 or voice input means 169 are employed instead of the keyboard 165. The memory unit 4 is a memory such as a ROM in which network data indicative of geographical points, namely desired destination and present position, and other information are stored in advance. As will be described below, a region name list 170, a landmark list 171, a region name frequency list 172, a landmark frequency list 173, a romaji (Roman character) sort file 174, a hiragana (the cursive Japanese syllabary) sort file 175 and intersection data 176 are stored.

FIGS. 25 and 26 illustrate the structure of data in this embodiment. FIG. 25(a) illustrates a list of region names collected over a comparatively wide area. For example, a region number 0 represents "KYOTO". As data, the list contains region names in kanji (Chinese characters), hiragana and Roman characters, code numbers the storage addresses of a region name (landmark) list, the numbers of items of data in a region name (landmark) list, and initial frequency. FIG. 25(b) illustrates a landmark list of landmarks constituting lower-order information under region names, e.g., place names, intersection names and the names of rivers, bridges and buildings. As data, the list contains names in kanji, hiragana and Roman characters, code numbers, east longitude and north latitude, initial frequency and attributes (genre information indicative of sightseeing, lodgings, dining, etc.). It can be arranged so that the region name list and landmark list are handled as intersection lists, and so that these can be made into lists of intersection names and landmarks between intersections.

FIGS. 25(c), (d) illustrate lists showing the frequency at which regions and landmarks are used. These are for being extracted with higher priority in a case where frequency of use is retrieved as data.

FIGS. 26(a), (b) show Roman character and hiragana sort files, respectively. Place names are arranged in alphabetical order or in the order of the Japanese syllabary, and data storage addresses are provided correspondingly thereto, thereby shortening the time needed to retrieve the place names. FIG. 26(c) illustrates an example of intersection data. Stored as data in correspondence with the intersection code numbers are intersection names, whether or not traffic signals are present, and the code numbers of intersections to be traversed next. Thus, a variety of navigational information is displayed on a display screen.

FIG. 27 illustrates an example of a method of inputting present location, in which (a) entails selecting a place name list of a region selected by designating a region name, and then selecting a particular place name and setting the related data, and (b) entails selecting, from a list, a place name corresponding to a genre selected by designating a genre such as sightseeing, lodgings or dining, and then selecting a particular place name and setting the related data. In a case where the names of candidates are few, it is possible to perform direct name selection.

Figure 28A:
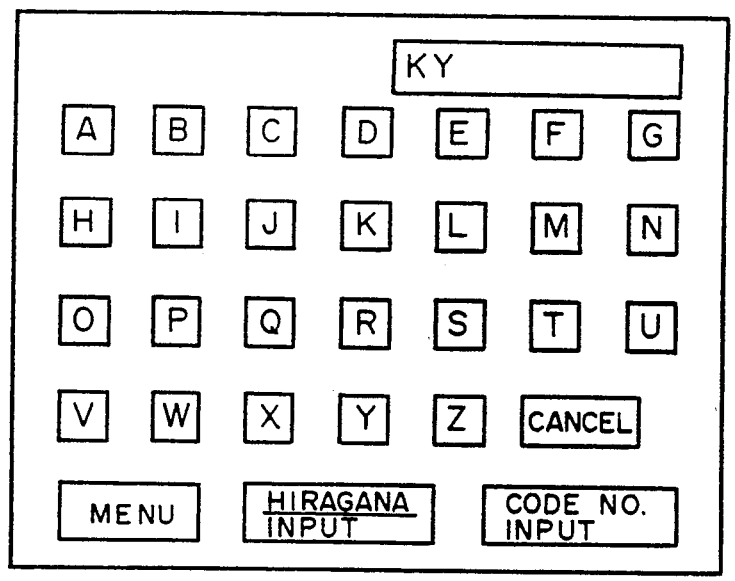
FIG. 28(a) is a view of a display screen for Roman character input.
Figure 28B:
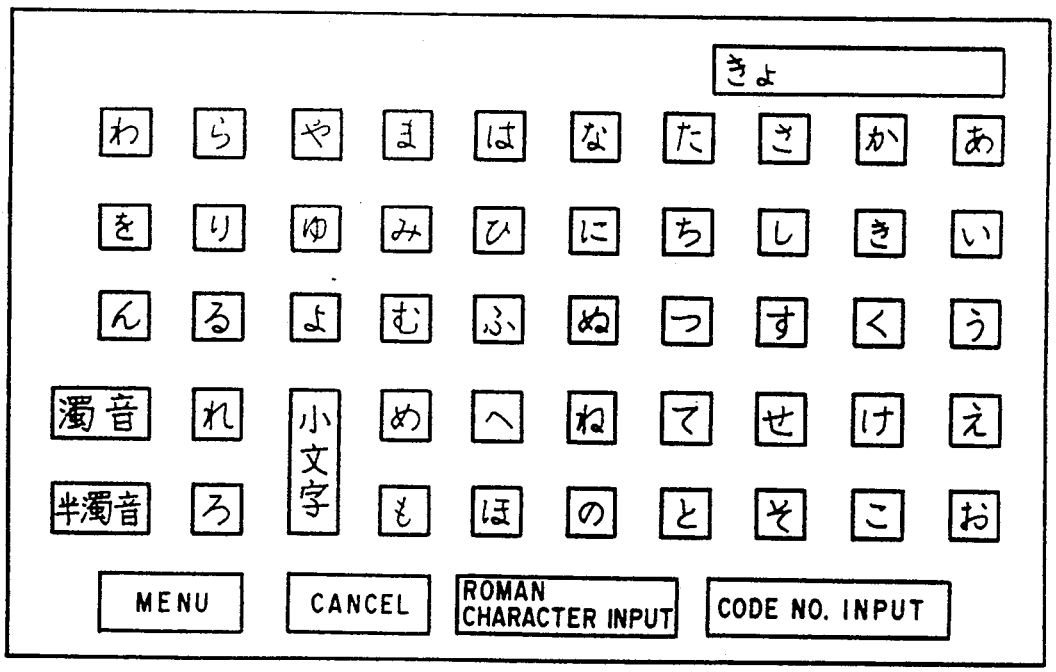
FIG. 28(b) is a view of a display screen for hiragana input.

FIGS. 28(a), (b) and FIG. 29(a) illustrate display screens when input is made on the display by a touch panel, light pen, mouse or the like. FIG. 28(a) shows a Roman character input screen, (b) a hiragana input screen, and FIG. 29(a) a code number input screen.

FIG. 29(b) depicts an example of a menu screen when a destination input is made. This illustrates a case in which "KY" is entered for retrieval and display of "KYOTO GOSHO, KIYOMIZU TEMPLE, KINKAKU TEMPLE".

The flow of processing for present location input will now be described with reference to FIGS. 30 and 31.

Figure 30:
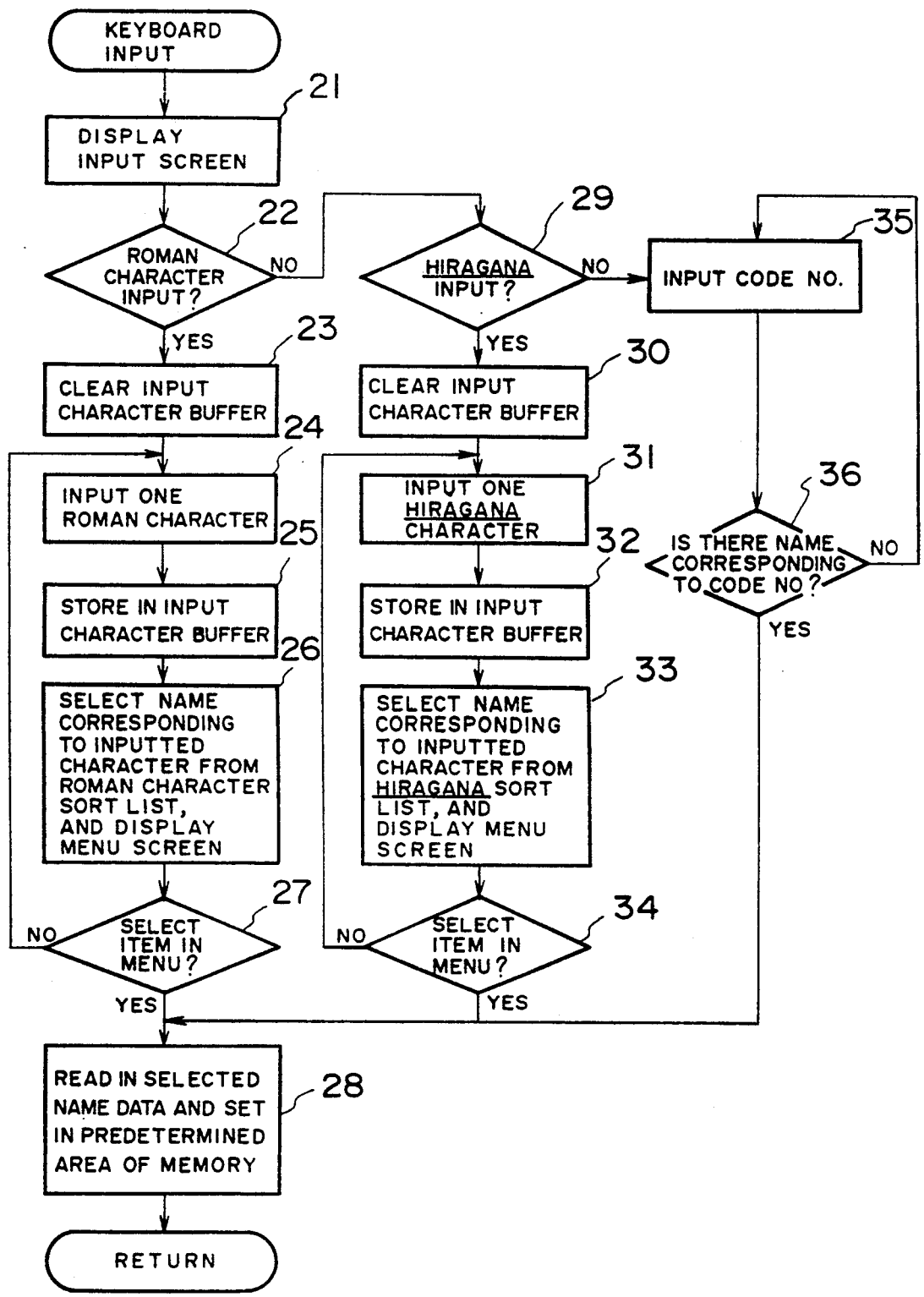
FIG. 30 is a flow chart of a present-position input method using the screens of FIGS. 28(a), 28(b) and 28(c)

FIG. 30 shows the flow of processing for name selection by keyboard. First, the input screen is displayed at step 21, after which it is determined at step 22 whether a Roman character input is made. In case of a Roman character input, an input character buffer is cleared, one Roman character is entered and this is stored in the input character buffer (steps 23–25). Next, names corresponding to the character string in the character buffer are selected from the Roman character sort list and displayed on the menu screen (step 26), and then an item in the menu is selected (step 27). If a selection can be made, name data selected at step 28 is read in and set in a predetermined area of a memory. If an item selected is not on the menu screen, the program returns to step 24 and the foregoing processing is repeated. If the input is not a Roman character input at step 22, it is determined at step 29 whether the input is a hiragana input. If it is a hiragana input, processing (steps 30–34), which is similar to the foregoing processing, is executed. If the input is not a hiragana input at step 29, a code number is entered (step 35). Then, if a name corresponds to the code number at step 36, the program proceeds to step 28.

Figure 31:
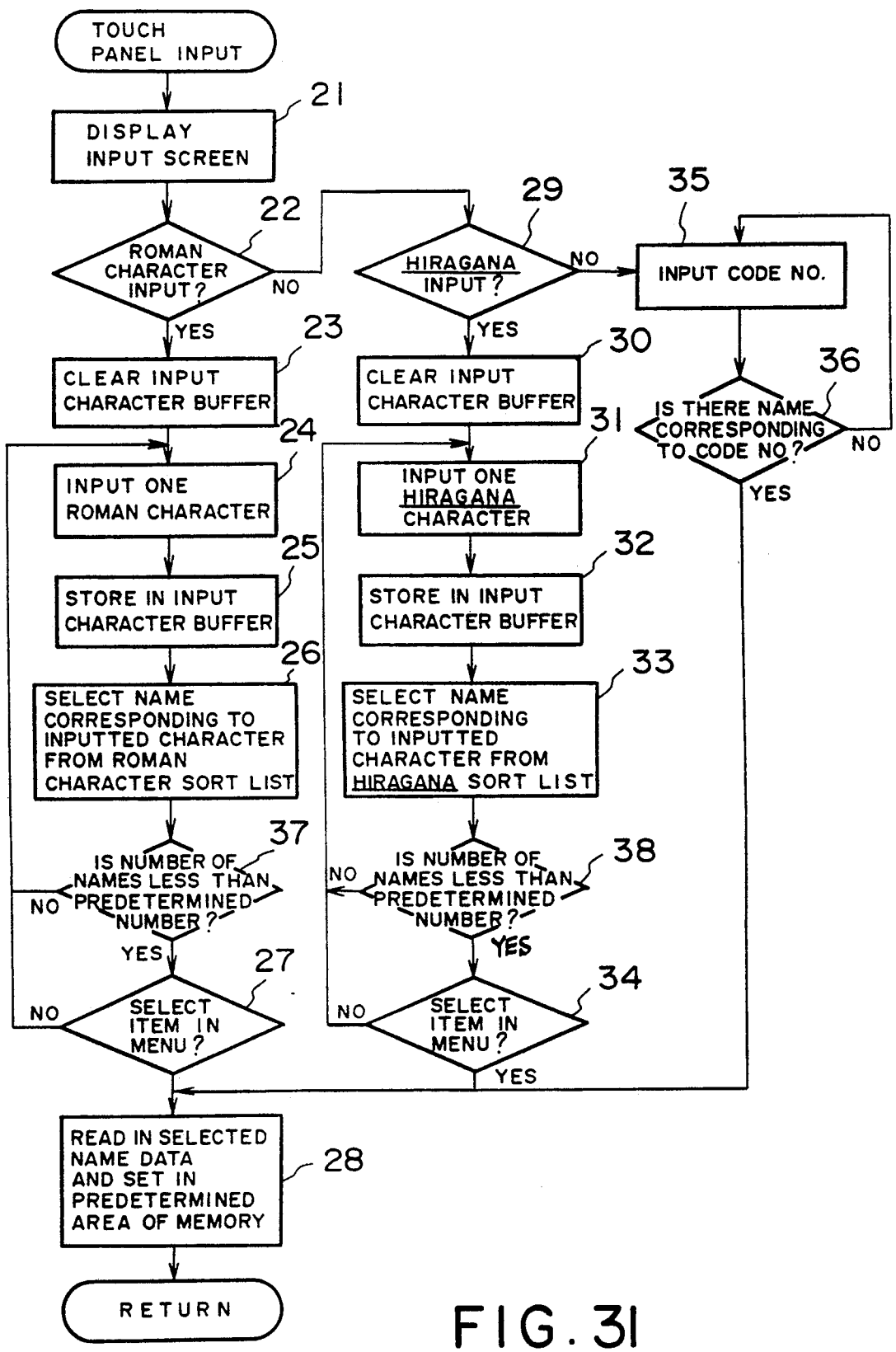
FIG. 31 is a flow chart similar to FIG. 31 but requiring limited number of selected names.

FIG. 31 shows the flow of processing for name selection by keyboard. Though the processing is basically similar to that of FIG. 30, here the processing is such that the number of place names corresponding to the character string is made less than a predetermined number by steps 37 and 38.

The present invention is not limited to the foregoing embodiment but can be modified in various ways. For example, an arrangement can be adopted in which a place name list of specific regions is stored on an IC card or CDROM.

Figure 32:
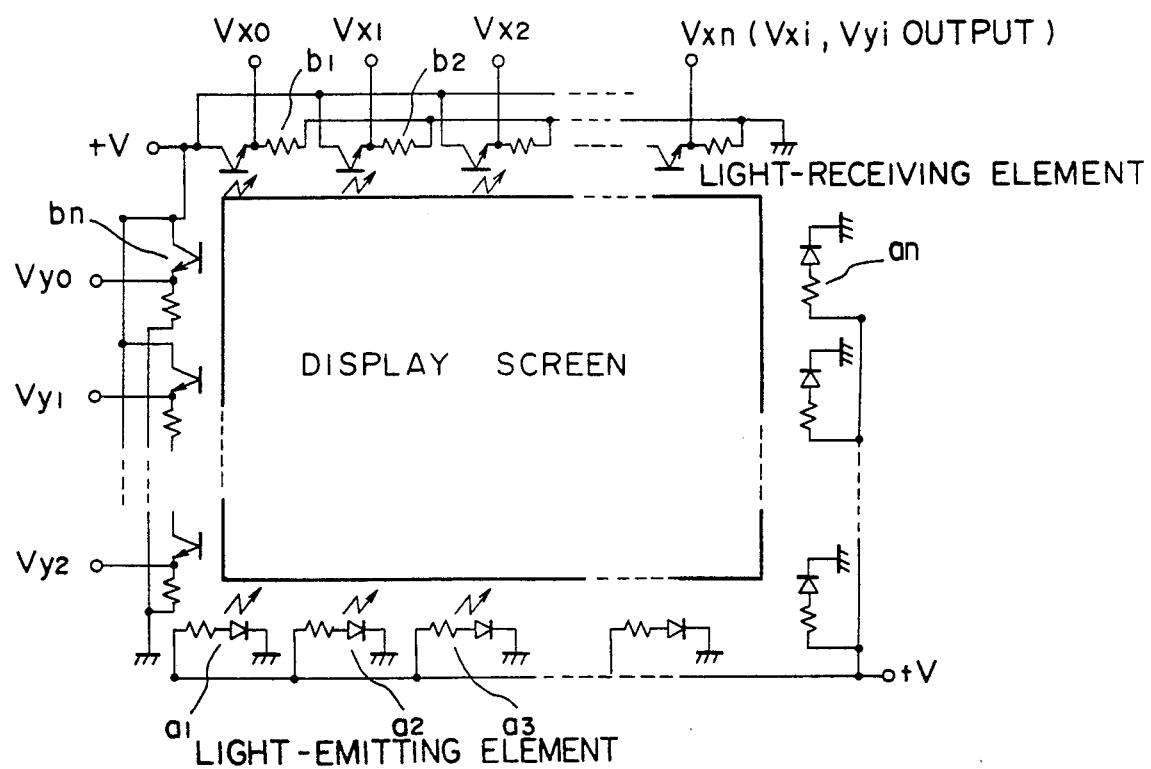
FIG. 32 is a diagram showing the structure of an infrared touch panel.
Figure 1:
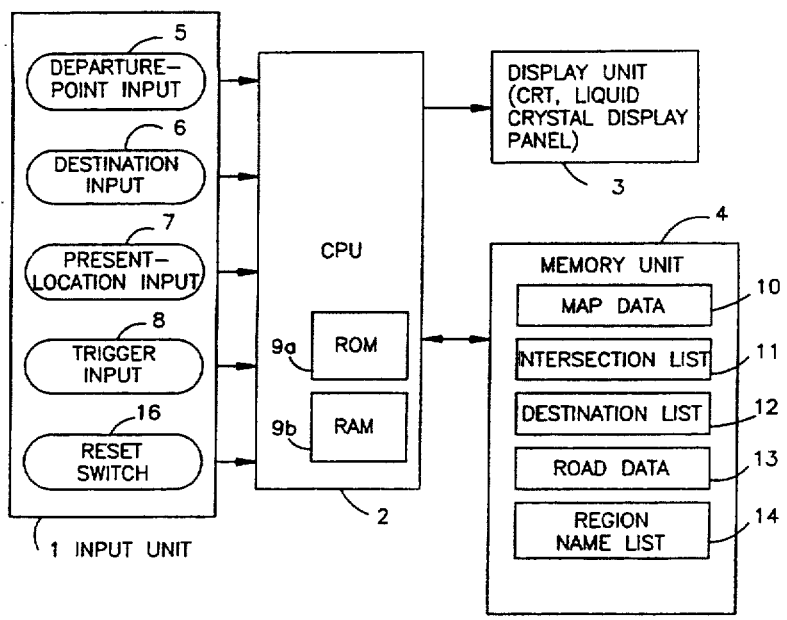
Figure 2:
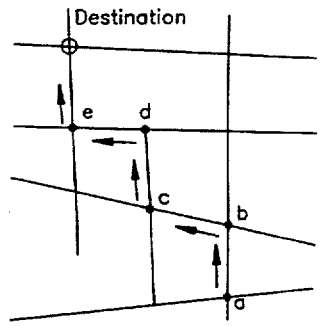
Figure 27A:
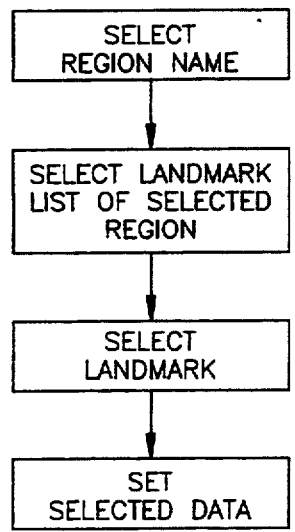
Figure 27B:
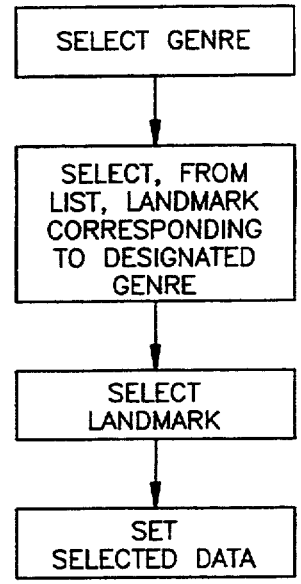

FIG. 32 shows the structure of an infrared touch panel as an example of the touch panel 166. Light-emitting elements $a_1, a_2, a_3, \ldots a_n$ are arrayed horizontally and vertically on a display screen, and light-receiving elements $b_1, b_2, b_3, \ldots b_n$ are arrayed horizontally and vertically on the display screen so as to oppose respective ones the light-emitting elements. When the display screen is touched by a finger tip, the touched position is detected by pairs of the horizontal and vertical elements. This makes detection of position possible.

The present invention is not limited to the foregoing embodiments but can be modified in various ways.

For example, in the foregoing embodiments, destinations and intersections are entered as code numbers. However, an arrangement can be adopted in which hiragana or Roman character data are provided as the destination and intersection data and these are entered by character retrieval.

Further, it is permissible to adopt an arrangement in which the conventional set-up provided with a distance sensor or steering sensor is combined with the navigation apparatus of the present invention. The resulting system can be adapted in such a manner that, rather than the next geographical point being identified only when a switch is operated by the driver, the navigation apparatus identifies predetermined geographical points automatically by other means and changes over the guidance information delivered to the driver each time.

With a combination of the present invention and the conventional system, it can be so arranged that a region having a simple road network, such as only a single road, is handled by the conventional system having the sensors, while a region having a complicated road network is dealt with by the system of the present invention. It can also be so arranged that the navigation apparatus of the present invention is used as a back-up if the conventional navigation apparatus fails.

It is also possible to provide information relating to the distances between geographical points at which guidance is given, determine distance by a distance sensor and then urge the driver to input the next geographical point (i.e., to make a trigger input) by a voice track or visual display.

Industrial Applicability

The navigation apparatus of the present invention is mounted on an automotive vehicle so that even a driver unfamiliar with the roads can be guided to a desired destination automatically. For this reason, the apparatus of the invention is especially useful in a society where the aging are increasing in number.

What is claimed is:

1. A vehicular navigation apparatus comprising:
   input means for inputting an initial departure point and a destination point;
   a random access memory including non-volatile random access memory;
   means for storing and preserving the initial departure point in the non-volatile random access memory even if an ignition switch is turned off;
   means for copying the initial departure point as a working departure point in the random access memory;
   memory means including stored course information and stored guidance information;
   means responsive to the working departure point and the destination point for determining a course from the working departure point to the destination point based upon the stored course information;
   display means for retrieving and displaying guidance information from the memory means to guide travel along the course;
   means responsive to an indication of arrival at the destination for setting the destination point as the working departure point and for permitting entry of a new destination point as the destination point or permitting entry of an indication of return to the initial departure point, said setting of the destination point as the working departure point being without disturbing said stored initial departure point in the non-volatile random access memory even if the working departure point is replaced a plurality of times by guided travel to a corresponding plurality of new destination points; and
   means responsive to entry of an indication of return to the initial departure point for setting the initial departure point as the destination point.

2. A vehicular navigation apparatus according to claim 1 wherein
   said course determining means determines a course having one or more sequential intermediate points from the working departure point to the destination point; and
   said display means includes means responsive to a start indication for displaying guidance information from the departure point to a first of the intermediate points, and means responsive to an indication of arrival at an intermediate point for displaying guidance information to a next point on the course.

3. A vehicular navigation apparatus according to claim 2 further including means for selectively inputting a trigger input or a present position input by an operator as said indication of arrival at an intermediate point; said present position input including means for entering a new point in the course and for redetermining the course from the new point to the destination.

4. A vehicular navigation apparatus according to claim 3 wherein said means for entering a new point includes means for extracting from the stored course information one or more named intersections within a predetermined distance from a present intermediate point and for displaying the extracted named intersections to permit the operator to select one of the displayed intersections as the new point in the course.

5. A vehicular navigation apparatus according to claim 3 wherein said memory means includes a list of intersections each having identifying character data of a region or a landmark; and said means for entering a new point includes means for entering character data, and means for selecting and displaying names of intersections within said intersection list which have identifying character data matching the entered character data to permit the operator to select one of the displayed intersections as the new point in the course.

6. A vehicle navigation apparatus according to claim 5 wherein the intersection list comprises a region name list and a landmark list, region names and landmarks being data of a hierarchical structure, and the apparatus has means for retrieving a landmark after a region is selected, and means for sorting region names and landmarks.

7. A vehicular navigation apparatus according to claim 6, wherein said memory means comprises an IC card or a CDROM storing the region name list and landmark list.

8. A vehicular navigation apparatus according to claim 1, wherein said input means comprises an input unit for inputting position by an infrared touch panel, and means for making a portion of said touch panel at which inputs can be made appear visually distinguishable from other portions thereof.

* * * * *

UNITED STATES PATENT AND TRADEMARK OFFICE
CERTIFICATE OF CORRECTION

PATENT NO. : 5,231,584
DATED : July 27, 1993
INVENTOR(S) : NIMURA et al

It is certified that error appears in the above-indentified patent and that said Letters Patent is hereby corrected as shown below:

IN THE DRAWINGS

Delete Drawing Sheet 1 and 24 and substitute therefor the Drawing Sheets consisting of FIGS. 1 and 2 and FIGS. 27(a) and 27(b) as shown on the attached pages.

```
Col. 1, line 67, before "intersection" insert --an--.

Col. 5, line 5, "hiragana" should be underlined;

line 15, "hiragana" should be underlined; and line 24, "FIG. 31" should read --FIG. 30--.

Col. 7, line 56, "(b)" should read --9(b)--.
```

UNITED STATES PATENT AND TRADEMARK OFFICE
CERTIFICATE OF CORRECTION

PATENT NO. : 5,231,584
DATED : July 27, 1993
INVENTOR(S) : NIMURA et al

It is certified that error appears in the above-indentified patent and that said Letters Patent is hereby corrected as shown below:

Col. 10, line 22, begin a new paragraph with "FIG. 20".

Col. 11, line 22, "romaji" should be underlined;

line 23, "hiragana" should be underlined;

line 29, "kanji" should be underlined;

line 30, "hiragana" should be underlined and after "numbers" insert a comma --,--;

line 37, "hiragana" and "kanji" should be underlined; and line 49, "hiragana" should be underlined.

UNITED STATES PATENT AND TRADEMARK OFFICE
CERTIFICATE OF CORRECTION

PATENT NO. : 5,231,584
DATED : July 27, 1993
INVENTOR(S) : NIMURA et al

It is certified that error appears in the above-indentified patent and that said Letters Patent is hereby corrected as shown below:

Col. 12, line 7, "hiragana" should be underlined;

line 33, "hiragana" should be underlined;

line 34, "hiragana" should be underlined;

line 36, "hiragana" should be underlined; and line 66, "hiragana" should be underlined.

Signed and Sealed this

Ninth Day of August, 1994

Attest:

BRUCE LEHMAN

Attesting Officer     Commissioner of Patents and Trademarks